US011864021B2

(12) United States Patent
Chen et al.

(10) Patent No.: US 11,864,021 B2
(45) Date of Patent: *Jan. 2, 2024

(54) METHOD AND APPARATUS FOR DELIVERING UPLINK BUFFER STATUS REPORT OF A RELAY IN A WIRELESS COMMUNICATION SYSTEM

(71) Applicant: ASUSTek Computer Inc., Taipei (TW)

(72) Inventors: I-Jen Chen, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 155 days.

This patent is subject to a terminal disclaimer.

(21) Appl. No.: 17/387,201

(22) Filed: Jul. 28, 2021

(65) Prior Publication Data

US 2021/0360470 A1 Nov. 18, 2021

Related U.S. Application Data

(63) Continuation of application No. 17/125,254, filed on Dec. 17, 2020, now Pat. No. 11,115,856.

(60) Provisional application No. 62/971,457, filed on Feb. 7, 2020.

(51) Int. Cl.
*H04W 28/02* (2009.01)
*H04W 72/52* (2023.01)

(52) U.S. Cl.
CPC ....... *H04W 28/0278* (2013.01); *H04W 72/52* (2023.01)

(58) Field of Classification Search
None
See application file for complete search history.

(56) References Cited

U.S. PATENT DOCUMENTS

| 11,115,856 B2* | 9/2021 | Chen ................. H04W 72/0486 |
| 2016/0374110 A1* | 12/2016 | Lee ........................ H04W 4/023 |
| 2021/0345383 A1* | 11/2021 | Tesanovic ......... H04W 28/0278 |
| 2022/0167382 A1* | 5/2022 | Zhuo ................. H04W 72/1278 |

OTHER PUBLICATIONS

3GPP TSG-RAN WG2 Meeting #108 Reno, USA Nov. 18-22, 2019 "TP for the pre-BSR" (Year: 2019).*

* cited by examiner

*Primary Examiner* — Mohammad S Adhami
(74) *Attorney, Agent, or Firm* — Skaar Ulbrich Macari, P.A.

(57) ABSTRACT

A method and device are disclosed from the perspective of a first Wireless Transmit/Receive Unit (WTRU). In one embodiment, the method includes the first WTRU triggering a first buffer status report (BSR), wherein the first BSR indicates an amount of data expected to arrive. The method also includes the first WTRU triggering a second BSR, wherein the second BSR indicates an amount of data already available. The method further includes the first WTRU generating a MAC (Medium Access Control) PDU (Protocol Data Unit), wherein the MAC PDU includes at most one first BSR MAC CE (Control Element) for the first BSR and at most one second BSR MAC CE for the second BSR.

20 Claims, 18 Drawing Sheets

| Index | BS value | Index | BS value | Index | BS value | Index | BS value |
|---|---|---|---|---|---|---|---|
| 0 | 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28581 |
| 2 | ≤ 14 | 10 | ≤ 198 | 18 | ≤ 2806 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

FIG. 11 (PRIOR ART)

| Index | BS value | Index | BS value | Index | BS value | Index | BS value |
|---|---|---|---|---|---|---|---|
| 0 | 0 | 64 | ≤ 560 | 128 | ≤ 31342 | 192 | ≤ 1754595 |
| 1 | ≤ 10 | 65 | ≤ 597 | 129 | ≤ 33376 | 193 | ≤ 1868488 |
| 2 | ≤ 11 | 66 | ≤ 635 | 130 | ≤ 35543 | 194 | ≤ 1989774 |
| 3 | ≤ 12 | 67 | ≤ 677 | 131 | ≤ 37850 | 195 | ≤ 2118933 |
| 4 | ≤ 13 | 68 | ≤ 720 | 132 | ≤ 40307 | 196 | ≤ 2256475 |
| 5 | ≤ 14 | 69 | ≤ 767 | 133 | ≤ 42923 | 197 | ≤ 2402946 |
| 6 | ≤ 15 | 70 | ≤ 817 | 134 | ≤ 45709 | 198 | ≤ 2558924 |
| 7 | ≤ 16 | 71 | ≤ 870 | 135 | ≤ 48676 | 199 | ≤ 2725027 |
| 8 | ≤ 17 | 72 | ≤ 926 | 136 | ≤ 51836 | 200 | ≤ 2901912 |
| 9 | ≤ 18 | 73 | ≤ 987 | 137 | ≤ 55200 | 201 | ≤ 3090279 |
| 10 | ≤ 19 | 74 | ≤ 1051 | 138 | ≤ 58784 | 202 | ≤ 3290873 |
| 11 | ≤ 20 | 75 | ≤ 1119 | 139 | ≤ 62599 | 203 | ≤ 3504487 |
| 12 | ≤ 22 | 76 | ≤ 1191 | 140 | ≤ 66663 | 204 | ≤ 3731968 |
| 13 | ≤ 23 | 77 | ≤ 1269 | 141 | ≤ 70990 | 205 | ≤ 3974215 |
| 14 | ≤ 25 | 78 | ≤ 1351 | 142 | ≤ 75598 | 206 | ≤ 4232186 |
| 15 | ≤ 26 | 79 | ≤ 1439 | 143 | ≤ 80505 | 207 | ≤ 4506902 |
| 16 | ≤ 28 | 80 | ≤ 1532 | 144 | ≤ 85730 | 208 | ≤ 4799451 |
| 17 | ≤ 30 | 81 | ≤ 1631 | 145 | ≤ 91295 | 209 | ≤ 5110989 |
| 18 | ≤ 32 | 82 | ≤ 1737 | 146 | ≤ 97221 | 210 | ≤ 5442750 |
| 19 | ≤ 34 | 83 | ≤ 1850 | 147 | ≤ 103532 | 211 | ≤ 5796046 |
| 20 | ≤ 36 | 84 | ≤ 1970 | 148 | ≤ 110252 | 212 | ≤ 6172275 |
| 21 | ≤ 38 | 85 | ≤ 2098 | 149 | ≤ 117409 | 213 | ≤ 6572925 |
| 22 | ≤ 40 | 86 | ≤ 2234 | 150 | ≤ 125030 | 214 | ≤ 6999582 |
| 23 | ≤ 43 | 87 | ≤ 2379 | 151 | ≤ 133146 | 215 | ≤ 7453933 |
| 24 | ≤ 46 | 88 | ≤ 2533 | 152 | ≤ 141789 | 216 | ≤ 7937777 |
| 25 | ≤ 49 | 89 | ≤ 2698 | 153 | ≤ 150992 | 217 | ≤ 8453028 |
| 26 | ≤ 52 | 90 | ≤ 2873 | 154 | ≤ 160793 | 218 | ≤ 9001725 |
| 27 | ≤ 55 | 91 | ≤ 3059 | 155 | ≤ 171231 | 219 | ≤ 9586039 |
| 28 | ≤ 59 | 92 | ≤ 3258 | 156 | ≤ 182345 | 220 | ≤ 10208280 |
| 29 | ≤ 62 | 93 | ≤ 3469 | 157 | ≤ 194182 | 221 | ≤ 10870913 |
| 30 | ≤ 66 | 94 | ≤ 3694 | 158 | ≤ 206786 | 222 | ≤ 11576557 |
| 31 | ≤ 71 | 95 | ≤ 3934 | 159 | ≤ 220209 | 223 | ≤ 12328006 |
| 32 | ≤ 75 | 96 | ≤ 4189 | 160 | ≤ 234503 | 224 | ≤ 13128233 |
| 33 | ≤ 80 | 97 | ≤ 4461 | 161 | ≤ 249725 | 225 | ≤ 13980403 |
| ... | ... | ... | ... | ... | ... | ... | ... |

FIG. 12A (PRIOR ART)

| Index | BS value | Index | BS value | Index | BS value | Index | BS value |
|---|---|---|---|---|---|---|---|
| ... | ... | ... | ... | ... | ... | ... | ... |
| 34 | ≤ 85 | 98 | ≤ 4751 | 162 | ≤ 265935 | 226 | ≤ 14887889 |
| 35 | ≤ 91 | 99 | ≤ 5059 | 163 | ≤ 283197 | 227 | ≤ 15854280 |
| 36 | ≤ 97 | 100 | ≤ 5387 | 164 | ≤ 301579 | 228 | ≤ 16883401 |
| 37 | ≤ 103 | 101 | ≤ 5737 | 165 | ≤ 321155 | 229 | ≤ 17979324 |
| 38 | ≤ 110 | 102 | ≤ 6109 | 166 | ≤ 342002 | 230 | ≤ 19146385 |
| 39 | ≤ 117 | 103 | ≤ 6506 | 167 | ≤ 364202 | 231 | ≤ 20389201 |
| 40 | ≤ 124 | 104 | ≤ 6928 | 168 | ≤ 387842 | 232 | ≤ 21712690 |
| 41 | ≤ 132 | 105 | ≤ 7378 | 169 | ≤ 413018 | 233 | ≤ 23122088 |
| 42 | ≤ 141 | 106 | ≤ 7857 | 170 | ≤ 439827 | 234 | ≤ 24622972 |
| 43 | ≤ 150 | 107 | ≤ 8367 | 171 | ≤ 468377 | 235 | ≤ 26221280 |
| 44 | ≤ 160 | 108 | ≤ 8910 | 172 | ≤ 498780 | 236 | ≤ 27923336 |
| 45 | ≤ 170 | 109 | ≤ 9488 | 173 | ≤ 531156 | 237 | ≤ 29735875 |
| 46 | ≤ 181 | 110 | ≤ 10104 | 174 | ≤ 565634 | 238 | ≤ 31666069 |
| 47 | ≤ 193 | 111 | ≤ 10760 | 175 | ≤ 602350 | 239 | ≤ 33721553 |
| 48 | ≤ 205 | 112 | ≤ 11458 | 176 | ≤ 641449 | 240 | ≤ 35910462 |
| 49 | ≤ 218 | 113 | ≤ 12202 | 177 | ≤ 683087 | 241 | ≤ 38241455 |
| 50 | ≤ 233 | 114 | ≤ 12994 | 178 | ≤ 727427 | 242 | ≤ 40723756 |
| 51 | ≤ 248 | 115 | ≤ 13838 | 179 | ≤ 774645 | 243 | ≤ 43367187 |
| 52 | ≤ 264 | 116 | ≤ 14736 | 180 | ≤ 824928 | 244 | ≤ 46182206 |
| 53 | ≤ 281 | 117 | ≤ 15692 | 181 | ≤ 878475 | 245 | ≤ 49179951 |
| 54 | ≤ 299 | 118 | ≤ 16711 | 182 | ≤ 935498 | 246 | ≤ 52372284 |
| 55 | ≤ 318 | 119 | ≤ 17795 | 183 | ≤ 996222 | 247 | ≤ 55771835 |
| 56 | ≤ 339 | 120 | ≤ 18951 | 184 | ≤ 1060888 | 248 | ≤ 59392055 |
| 57 | ≤ 361 | 121 | ≤ 20181 | 185 | ≤ 1129752 | 249 | ≤ 63247269 |
| 58 | ≤ 384 | 122 | ≤ 21491 | 186 | ≤ 1203085 | 250 | ≤ 67352729 |
| 59 | ≤ 409 | 123 | ≤ 22885 | 187 | ≤ 1281179 | 251 | ≤ 71724679 |
| 60 | ≤ 436 | 124 | ≤ 24371 | 188 | ≤ 1364342 | 252 | ≤ 76380419 |
| 61 | ≤ 464 | 125 | ≤ 25953 | 189 | ≤ 1452903 | 253 | ≤ 81338368 |
| 62 | ≤ 494 | 126 | ≤ 27638 | 190 | ≤ 1547213 | 254 | > 81338368 |
| 63 | ≤ 526 | 127 | ≤ 29431 | 191 | ≤ 1647644 | 255 | Reserved |

FIG. 12B (PRIOR ART)

| Index | LCID values |
|---|---|
| 0 | CCCH |
| 1–32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS / CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 13 (PRIOR ART)

| Index | LCID values |
|---|---|
| 0 | CCCH of size 64 bits (referred to as "CCCH1" in TS 38.331 [5]) |
| 1–32 | Identity of the logical channel |
| 33–51 | Reserved |
| 52 | CCCH of size 48 bits (referred to as "CCCH" in TS 38.331 [5]) |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

FIG. 14 (PRIOR ART)

METHOD AND APPARATUS FOR DELIVERING UPLINK BUFFER STATUS REPORT OF A RELAY IN A WIRELESS COMMUNICATION SYSTEM

CROSS-REFERENCE TO RELATED APPLICATIONS

This application is a Continuation of U.S. patent application Ser. No. 17/125,254, filed Dec. 17, 2020, which claims the benefit of U.S. Provisional Patent Application Ser. No. 62/971,457 filed on Feb. 7, 2020, the entire disclosure of which is incorporated herein in its entirety by reference.

FIELD

This disclosure generally relates to wireless communication networks, and more particularly, to a method and apparatus for delivering uplink buffer status report of a relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first Wireless Transmit/Receive Unit (WTRU). In one embodiment, the method includes the first WTRU triggering a first buffer status report (BSR), wherein the first BSR indicates an amount of data expected to arrive. The method also includes the first WTRU triggering a second BSR, wherein the second BSR indicates an amount of data already available. The method further includes the first WTRU generating a MAC (Medium Access Control) PDU (Protocol Data Unit), wherein the MAC PDU includes at most one first BSR MAC CE (Control Element) for the first BSR and at most one second BSR MAC CE for the second BSR.

BRIEF DESCRIPTION OF THE DRAWINGS

FIG. 11 is a reproduction of Table 6.1.3.1-1 of 3GPP TS 38.321 V15.4.0.

FIGS. 12A and 12B are a reproduction of Table 6.1.3.1-2 of 3GPP TS 38.321 V15.4.0.

FIG. 13 is a reproduction of Table 6.2.1-1 of 3GPP TS 38.321 V15.4.0.

FIG. 14 is a reproduction of Table 6.2.1-2 of 3GPP TS 38.321 V15.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V15.4.0, "NR, NR and NG-RAN overall description, Stage 2"; TS 38.321 V15.4.0, "NR, Medium Access Control (MAC) protocol specification"; TS 38.331 V15.6.0, "NR, Radio Resource Control (RRC) protocol specification"; TR 38.874 V16.0.0, "Study on Integrated Access and Backhaul"; RP-172290, "New SID Proposal: Study on Integrated Access and Backhaul for NR", AT&T, Qualcomm, and Samsung; RP-182882, "New WID: Integrated Access and Backhaul for NR", Qualcomm; RAN2 #104 meeting minutes; RAN2 #107bis meeting minutes; and RAN2 #108 meeting minutes; R2-1916537, "TP for the pre-BSR", Huawei and HiSilicon. The standards and documents listed above are hereby expressly incorporated by reference in their entirety.

Figure 1:
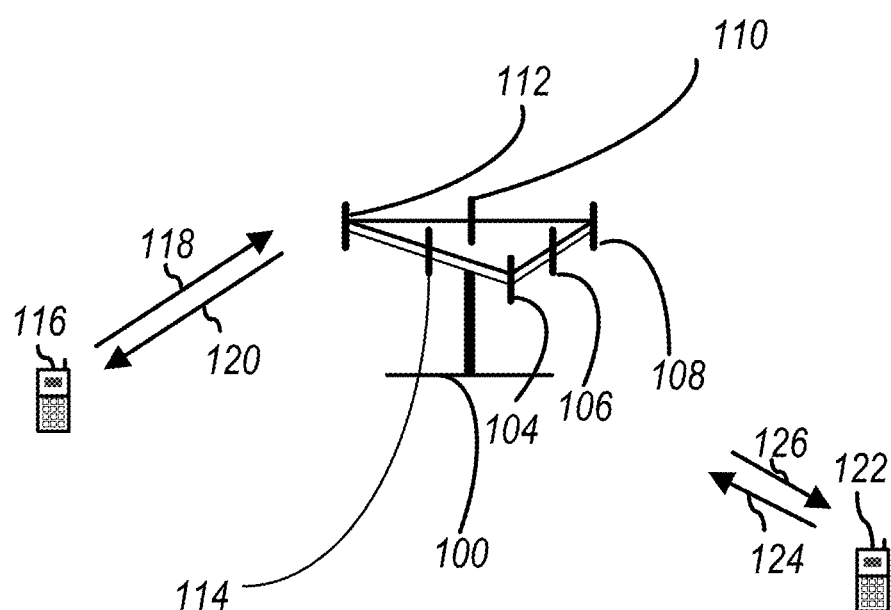
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
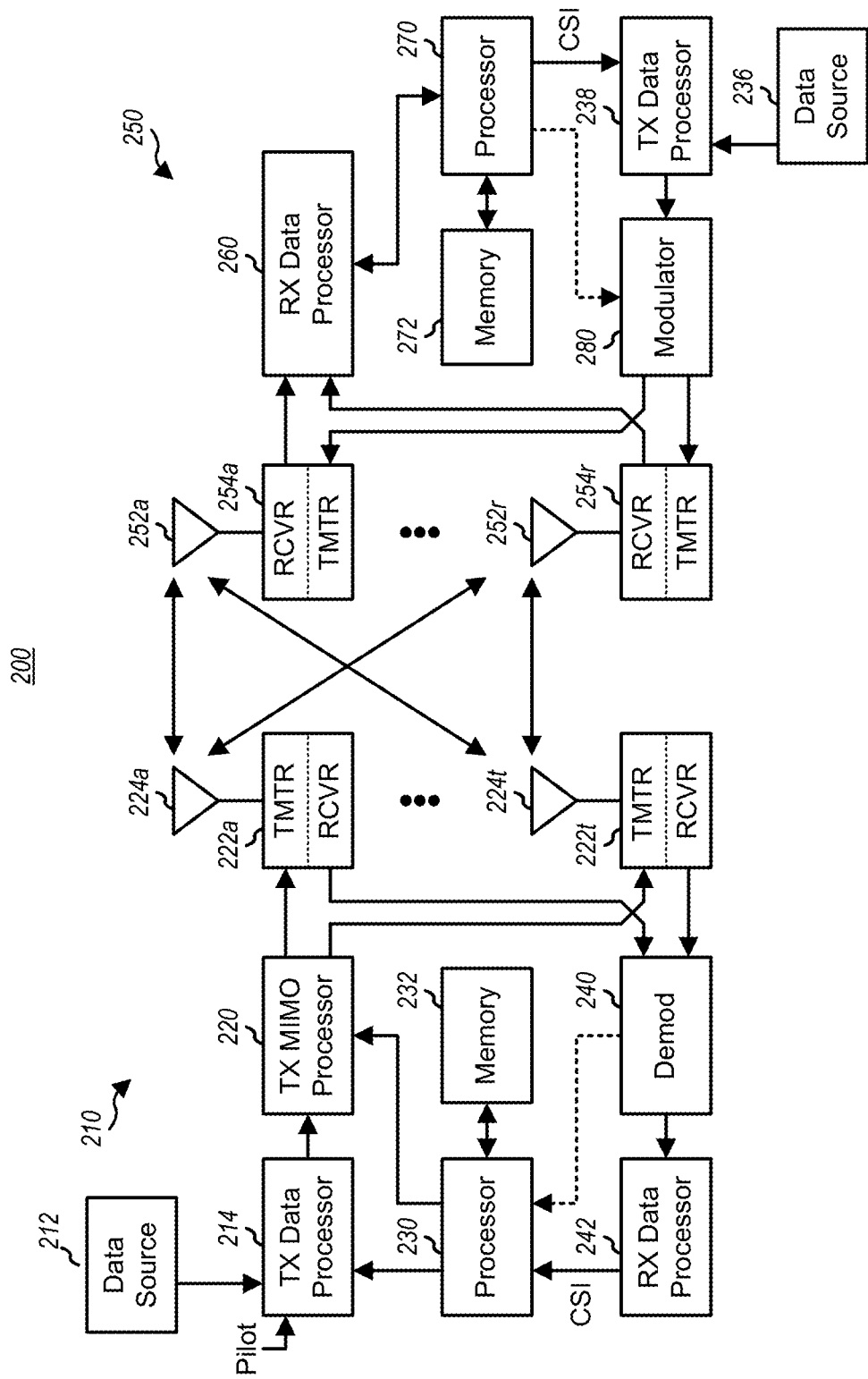
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
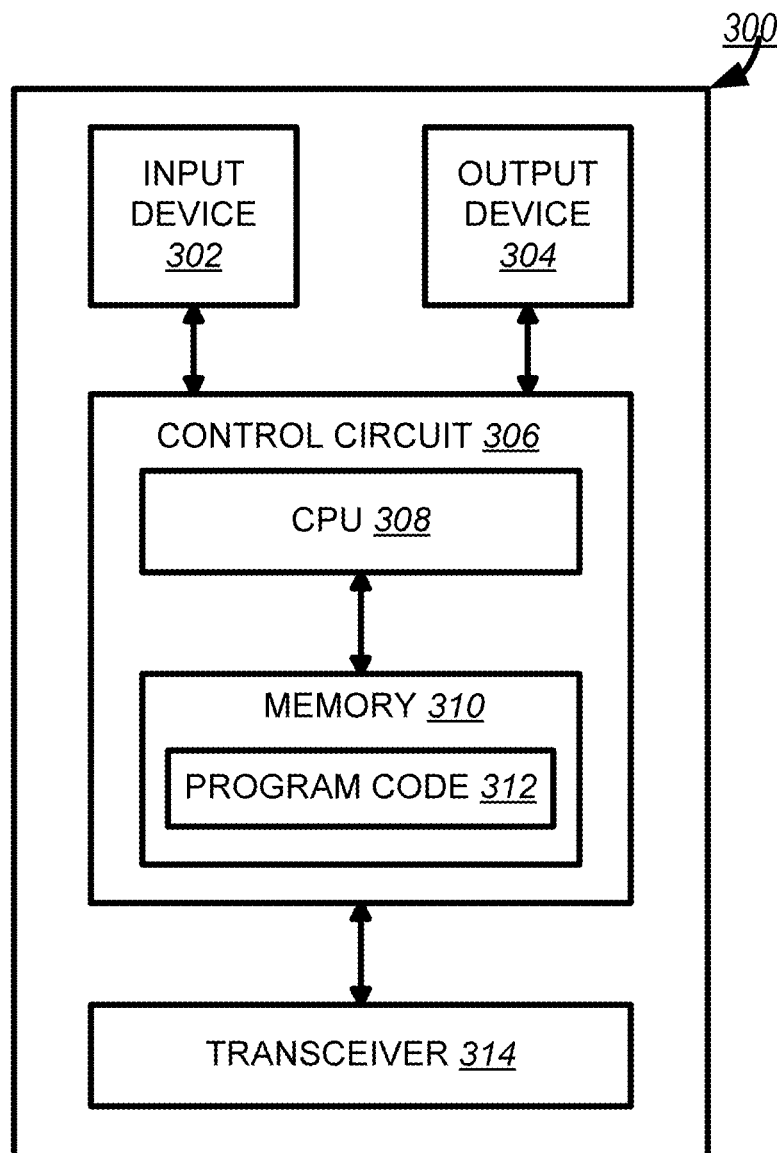
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
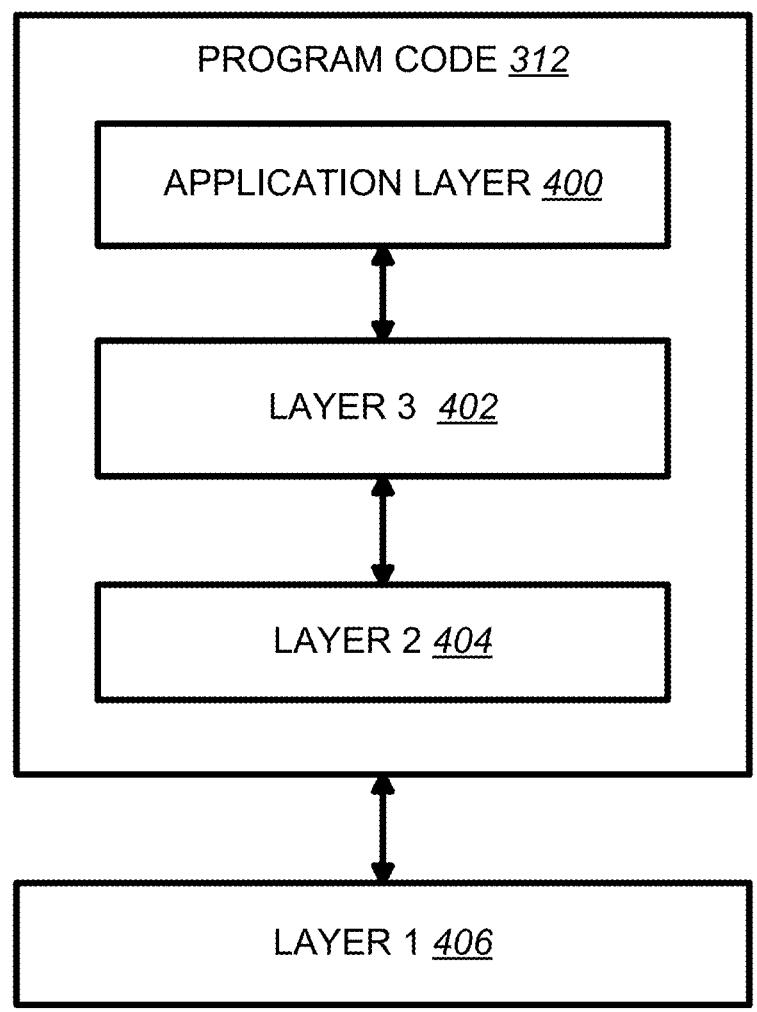
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The new study item about integrated access and backhaul (JAB) for NR is described in 3GPP RP-172290, and 3GPP TR 38.874 is the technical report (TR) for this study item. In 3GPP RP-182882, the work item about integrated access and backhaul (JAB) for NR is described for further development. 3GPP RP-182882 states:

3 Justification

One of the potential technologies targeted to enable future cellular network deployment scenarios and applications is the support for wireless backhaul and relay links enabling flexible and very dense deployment of NR cells without the need for densifying the wired transport network proportionately.

The expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner than in LTE by building upon many of the NR control and data channels/procedures defined for providing access to UEs. An example illustration of a network with such integrated access and backhaul links is shown in FIG. 1, where relay nodes (IAB-nodes) can multiplex access and backhaul links in time, frequency, and/or space (e.g. beam-based operation).

Figure 5:
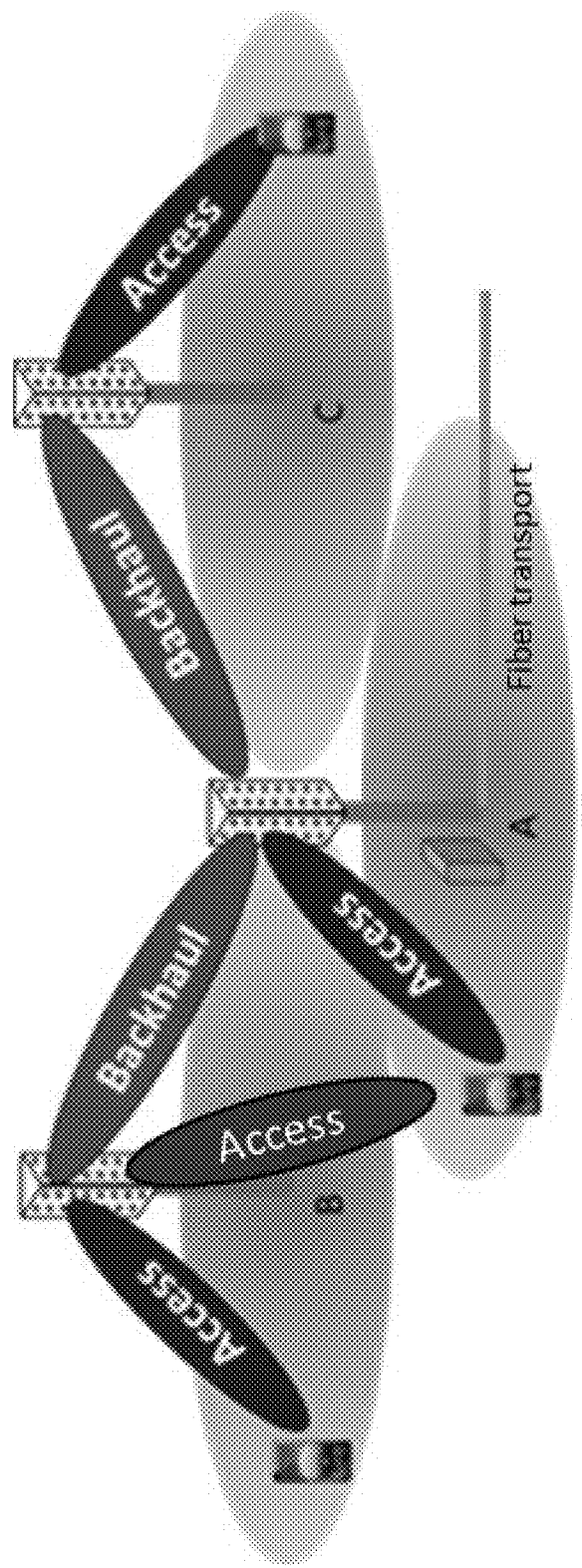
FIG. 5 is a reproduction of FIG. 1 of 3GPP RP-182882.

FIG. 1 of 3GPP RP-182882, Entitled "Integrated Access and Backhaul Links", is Reproduced as FIG. 5

The operation of access and backhaul may be on the same or different frequencies (also termed 'in-band' and 'out-of-band' relays). While efficient support of out-of-band relays is important for some NR deployment scenarios, it is critically important to support in-band operation which implies tighter interworking with the access links operating on the same frequency to accommodate duplex constraints and avoid/mitigate interference.

Due to the short range of mmWave access, extension of wireless backhauling to multiple hops is an essential feature. Such multi-hop backhauling also enhances flexibility when using self-backhauling in dense urban environments, where the backhaul path needs to adapt to the infrastructure. While the typical number of backhaul hops is expected to be small (e.g. 1-4), the architecture should not principally restrict the hop count so that larger hop count can be supported.

Further, operating NR systems in mmWave spectrum presents some unique challenges including experiencing severe short-term blocking. Overcoming short-term blocking in mmWave systems requires RAN-based mechanisms for switching between IAB-nodes with little or no involvement of the core network. The above described need to mitigate short-term blocking for NR operation in mmWave spectrum along with the desire for easier deployment of self-backhauled NR cells creates a need for the development of an integrated framework that allows fast switching of access and backhaul links.

Finally, the integrated access and backhaul system should be compliant with SA and NSA deployments in that IAB-nodes can operate in SA or NSA mode, meaning that support needs to be provided for dual connectivity (both EN-DC and NR-DC) for both UEs and IAB-nodes.

The study item 750047 "Integrated Access and Backhaul for NR" recommends an IAB architecture candidate, referred to as architecture 1a, which supports the aforementioned features (TR 38.874). The study further establishes detailed recommendations on the L2 design for integrated access and backhauling as well as enhancements to NR physical layer specifications.

IAB is very beneficial for NR rollout and during the early phases of the initial growth phase. Consequently, postponing IAB-related work to a later stage may have adverse impact on the timely deployment of NR access.

4 Objective 4.1 Objective of SI or Core Part WI or Testing Part WI

The objectives of IAB for NR WI follow the recommendations by the study item on IAB for NR, which are defined in TR 38.874. With these recommendations, IAB supports the following features:

Multi-hop backhauling for flexible range extension for both FR1 and FR2.

Topology adaptation including redundant connectivity to optimize backhauling performance and to respond to backhaul (BH) link failure.

Mapping of UE bearers to backhaul RLC channels and QoS enforcement over backhaul RLC channels to meet E2E QoS requirements.

Scalability to a large number of UEs.

Flexible deployment allowing IAB-node operation in EN-DC mode with EPC or in SA-mode with 5GC.

Support for NR-NR DC from the UE and IAB-node perspective (see NOTE 1)

Efficient operation for both inband and out-of-band relaying.

OTA synchronization across IAB topology.

Support of Rel-15 UEs.

Detailed objectives of the work item include:

Specification of an IAB-node following architecture 1a including [RAN2-led, RAN3]:

Routing function on IAB-node to support forwarding across the multi-hop topology based on routing identifier.

Hop-by-hop propagation of signalling to support low latency scheduling (e.g. TR 38.874 clause 8.6), BH RLF handling (e.g. TR 38.874 clause 9.7.14-15) and resource coordination across the multi-hop topology (e.g. TR 38.874 clause 7.3.3).

UE-bearer to BH RLC-channel mapping and mapping between ingress and egress BH RLC channels functions for support of one-to-one and many-to-one bearer mapping.

Enhancements to gNB functionality to serve as an IAB-donor following architecture 1a [RAN3, RAN2]

Functions on gNB CU-CP for topology, route and resource management [RAN3-led].

Support for IP routability to IAB-node (e.g. from CU, OAM) [RAN3-led].

Bearer mapping function on gNB DU to map downlink traffic of one or many UE-bearers to a BH RLC-channel [RAN2-led].

Specification of possible enhancements to E1, F1 and X2/Xn interfaces [RAN3-led, RAN2]:
On F1:
security protection over the wireless backhaul links. setting up and reconfiguring IAB-nodes and IAB-donor DUs
On X2 and Xn, necessary functions to enable DC operation with IAB.
On E1, configuration of necessary IAB-specific transport and/or security protection of F1-U.
Specification of procedures for IAB-node integration and topology adaptation, including [RAN3-led, RAN2]:
Procedures for IAB-node integration for SA and NSA modes, including enhancements needed to E-UTRAN for NSA mode.
Specification of IAB-node migration underneath the same IAB-donor (with or without a change of IAB-donor DU), and between different IAB-donors. Migration of IAB-node could be network-controlled or could be due to BH RLF. Support for route redundancy and route selection based on multi-connectivity (e.g. TR 38.874 clause 9.7), leveraging existing NR solutions as well as NR-NR DC, without additional RAN1 work. (see NOTE1).
Specification of enhancements to L2 wireless transport [RAN2-led, RAN3]:
Specification of an adaptation layer above RLC layer. The adaptation layer supports routing across the wireless backhaul and IP as next protocol layer.
Extension of LCID space and potentially LCG space to support one-to-one mapping of UE bearers to BH RLC channels. The extension of LCID space and LCG space is applicable only to IAB-nodes.
Specification of a flow control mechanism (for DL and, if necessary, for UL) to handle congestion.
Specification of mechanisms to enable lossless delivery in hop-by-hop ARQ.
Specification of signalling for L2 transport and resource management [RAN2-led, RAN3, RAN1]:
Specification of RRC and F1-AP procedures and messages for: the setup and release of IAB-nodes; configuration of adaptation layer at the IAB-nodes and IAB-donor DU; configuration of BH RLC channels, QoS information, routing tables, bearer-mappings; configuration of means for network synchronization; and configuration for sharing of time-domain resources among backhaul and access links (see physical layer specification).
Specification of an IP address allocation mechanism for the IAB-nodes [RAN3].
Specification of enhancements to bearer context setup/release procedures to support flow QoS across multiple hops.
Specification of signalling to enable aspects of radio-aware scheduling on IAB-nodes and IAB-donor DUs (e.g. as discussed in TR 38.874 clauses 8.2.4.2-3).
Specification of enhancement for uplink resource request procedure and related signalling to enable low latency uplink data scheduling.
Specification of BH RLF handling (e.g. downstream BH RLF notification).
Current study status of IAB is specified in 3GPP TR 38.874. Relevant portions of 3GPP TR 38.374 about IAB, which may assist the better understanding, are provided below:

5.2.1 Multi-Hop Backhauling

Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

The maximum number of hops in a deployment is expected to depend on many factors such as frequency, cell density, propagation environment, and traffic load. These factors are further expected to change over time. From the architecture perspective, flexibility in hop count is therefore desirable.

With increasing number of hops, scalability issues may arise and limit performance or increase signaling load to unacceptable levels. Capturing scalability to hop count as a KPI is therefore an important aspect of the study.

Requirements: IAB design shall support multiple backhaul hops
The architecture should not impose limits on the number of backhaul hops.
The study should consider scalability to hop-count an important KPI.
Single hop should be considered a special case of multiple backhaul hops.
[ . . . ]
6.1.1 Functions and Interfaces for IAB FIG. 6.1.1-1 of 3GPP TR 38.874 V16.0.0, Entitled "Reference Diagram for IAB-Architectures (SA Mode)", is Reproduced as FIG. 6

IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined a component of the Mobile Equipment. In the context of this study, MT is referred to as a function residing on an IAB-node that terminates the radio interface layers of the backhaul Uu interface toward the IAB-donor or other IAB-nodes.

Figure 6:
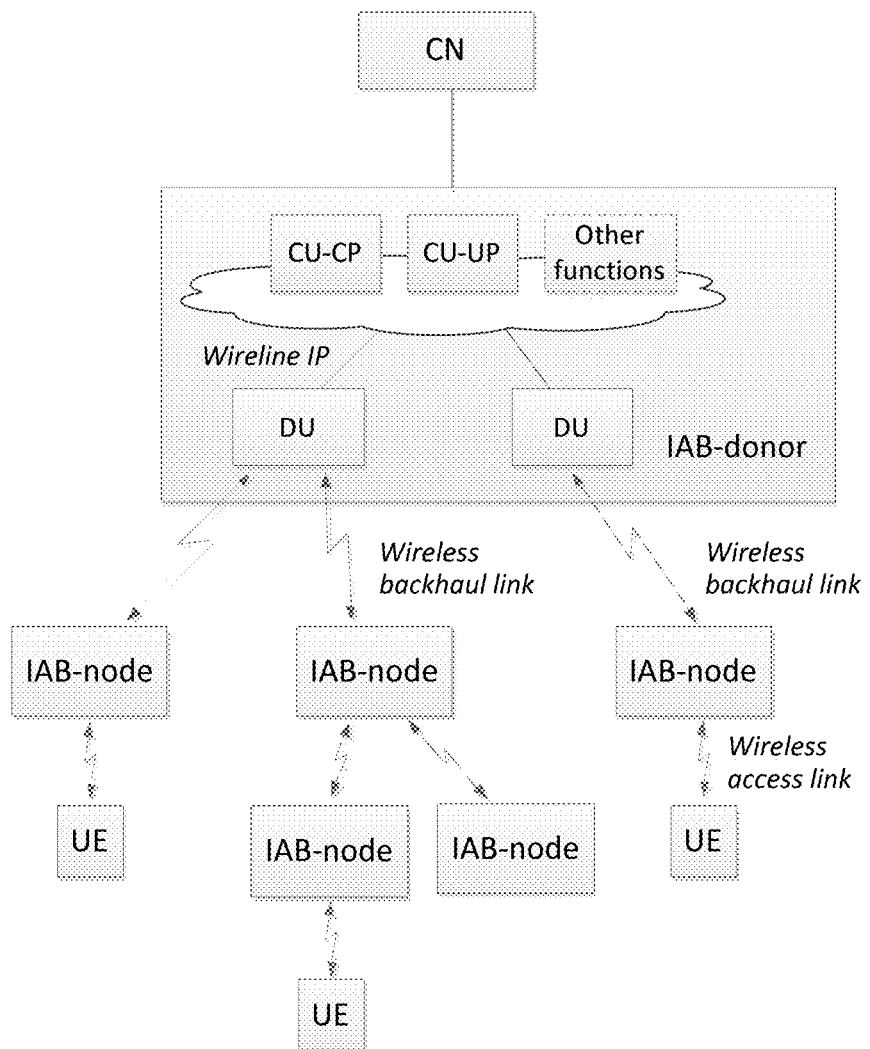
FIG. 6 is a reproduction of FIG. 6.1.1-1 of 3GPP TR 38.874 V16.0.0.

FIG. 6.1.1-1 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.
[ . . . ]
7.2.1 IAB-Node Initial Access (Stage 1)

In case of SA deployments, initial IAB-node discovery by the MT (Stage 1) follows the same Rel-15 initial access procedure as an UE, including cell search based on the same SSBs available for access UEs, SI acquisition, and random access, in order to initially set up a connection to a parent IAB-node or a IAB-donor.

In case of an NSA deployment (from an access UE perspective), when the IAB-node MT performs initial access on the NR carrier, it follows the same Stage 1 initial access as in SA deployments (from an access UE perspective). The SSB/RMSI periodicity assumed by the MTs for initial access may be longer than 20 ms assumed by Rel-15 UEs, and a single value is to be selected from the following candidate values: 20 ms, 40 ms, 80 ms, 160 ms.

NOTE: This implies that the candidate parent IAB-nodes/donors must support both NSA functionality for the UE and SA functionality for the MT on the NR carrier.

When IAB-node MT performs initial access on a LTE carrier, Stage 2 solutions can be used for IAB-node parent selection by the MT on the NR carrier.

7.2.2 Inter-IAB Node Discovery and Measurement (Stage 2)

For the purpose of backhaul link RSRP/RSRQ RRM measurements IAB supports both SSB-based and CSI-RS based solutions.

For the purpose of inter-IAB node and donor detection after the IAB node DU becomes active (Stage 2), the inter IAB-node discovery procedure needs to take into account the half-duplex constraint at an IAB node and multi-hop topologies. The following three solutions are supported:

SSB-Based Solutions (Solution 1-A and 1-B):

Solution 1-A) Reusing the same set of SSBs used for access UEs
  In this case, the SSBs for inter-IAB cell search in stage 2 are on the currently defined sync raster for a SA frequency layer, while for a NSA frequency layer the SSBs are transmitted inside of the SMTC configured for access UEs.

Solution 1-B) Use of SSBs which are orthogonal (TDM and/or FDM) with SSBs used for access UEs
  In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access UEs.

An IAB node should not mute its own SSB transmissions targeting UE cell search and measurement when doing inter-IAB cell search in stage 2
  For SA, this means that SSBs transmitted on the currently defined sync raster follow the currently defined periodicity for initial access.
  In case of Solution 1-B, this implies SSBs, that may get muted, for inter-IAB stage 2 cell search is at least TDM with SSBs used for UE cell search and measurements.

CSI-RS Based Solutions (Solution 2):
  CSI-RS can be used for inter-IAB detection in synchronous network To support IAB-node initial access and Stage 2 inter-IAB-node discovery and measurement, enhancements to existing Rel.15 SMTC/CSI-RS/RACH configurations and RMSI may need to be supported as well as coordination across IAB-nodes.

7.2.3 IAB-Node RACH

IAB supports the ability of network flexibility to configure backhaul RACH resources with different occasions, longer RACH periodicities, and additional preamble formats allowing for longer RTT, compared to access RACH resources without impacting Rel-15 UEs.

Based on Rel-15 PRACH configurations, the network is allowed to configure offset(s) for PRACH occasions for the MT of IAB node(s), in order to TDM backhaul RACH resources across adjacent hops.

7.2.4 Backhaul Link Management

An IAB-node supports mechanisms for detecting/recovering from backhaul link failure based on Rel-15 mechanisms. Enhancements to Beam Failure Recovery and Radio Link Failure procedures are beneficial and should be supported for NR IAB, including:
  Enhancements to support interaction between Beam Failure Recovery success indication and RLF;
  Enhancements to existing beam management procedures for faster beam switching/coordination/recovery to avoid backhaul link outages should be considered for IAB-nodes.

In addition, the need for additional backhaul link condition notification mechanism (E.g., if the parent IAB-node's backhaul link fails) from the parent IAB-node DU to the child IAB-node as well as corresponding IAB-node behaviour were studied. Solutions to avoid RLF at a child IAB-node due to parent backhaul link failure should be supported.

[ . . . ]

7.3.1 Scheduling of Backhaul and Access Links

Figure 7:
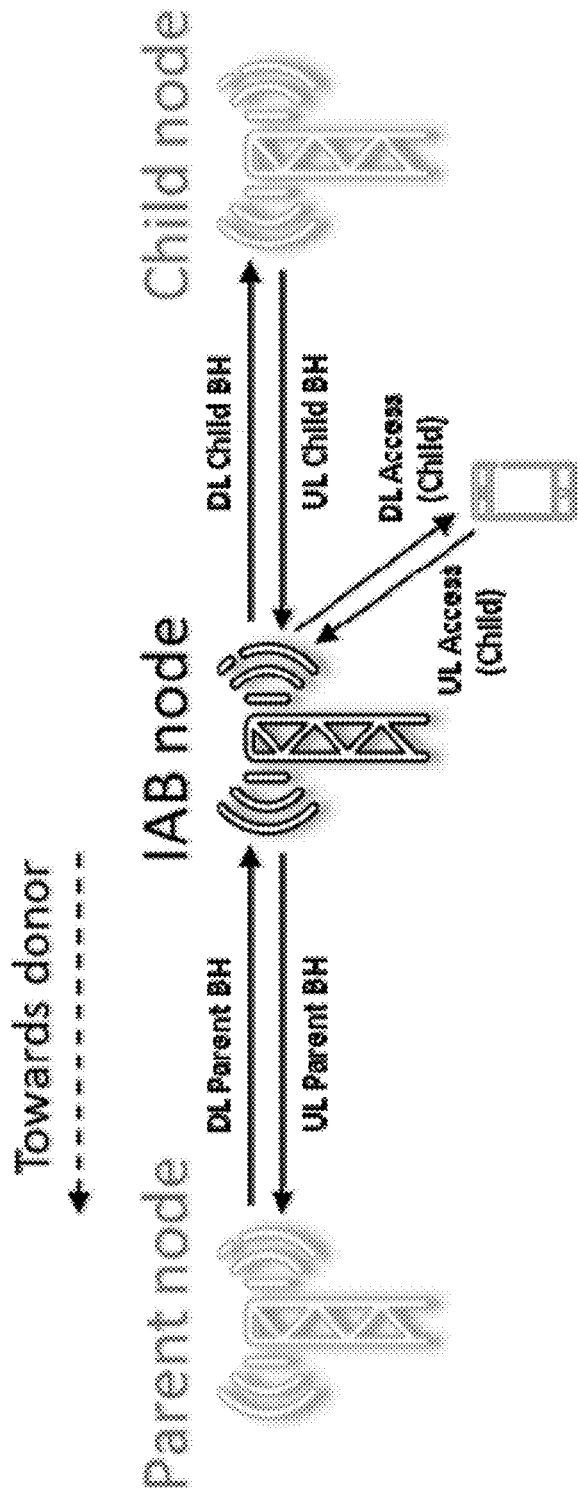
FIG. 7 is a reproduction of FIG. 7.3.1-1 of 3GPP TR 38.874 V16.0.0.

As shown in FIG. 7.3.1-1, the following link types are supported for IAB:
  Access link: a link between an access UE and an IAB-node or IAB-donor ($L_{A,DL}$ or $L_{A,UL}$);
  Backhaul link: a link between an IAB-node and an IAB child node ($L_{C,DL}$ or $L_{C,UL}$) or an IAB parent node ($L_{P,DL}$ or $L_{P,UL}$).

FIG. 7.3.1-1 of 3GPP TR 38.874 V16.0.0, Entitled "Different IAB Link Types", is Reproduced as FIG. 7

Note that depending on the topology/architectures considered in Section 6 and 9 respectively, the IAB-node may have its functions for UL access and child BH respectively in the same location or different locations, and for a given BH link for an IAB-node, it may be a parent BH or a child BH, depending on the topology/architecture.

Downlink IAB node transmissions (i.e. transmissions on backhaul links from an IAB-node to child IAB-nodes served by the IAB-node and transmissions on access links from an IAB-node to UEs served by the IAB-node) should be scheduled by the IAB-node itself. Uplink IAB transmission (transmissions on a backhaul link from an IAB-node to its parent IAB-node or IAB-donor) should be scheduled by the parent IAB-node or IAB-donor.

[ . . . ]

8.2.2 Adaptation Layer

The UE establishes RLC channels to the DU on the UE's access IAB node in compliance with TS 38.300. Each of these RLC-channels is extended via a potentially modified form of F1-U, referred to as F1*-U, between the UE's access DU and the IAB donor.

The information embedded in F1*-U is carried over RLC-channels across the backhaul links. Transport of F1*-U over the wireless backhaul is enabled by an adaptation layer, which is integrated with the RLC channel.

Within the IAB-donor (referred to as fronthaul), the baseline is to use native F1-U stack (see section 9). The IAB-donor DU relays between F1-U on the fronthaul and F1*-U on the wireless backhaul.

Functions Supported by the Adaptation Layer

In architecture 1a, information carried on the adaptation layer supports the following functions:
- Identification of the UE-bearer for the PDU;
- Routing across the wireless backhaul topology;
- QoS-enforcement by the scheduler on DL and UL on the wireless backhaul link;
- Mapping of UE user-plane PDUs to backhaul RLC channels;
- Potentially other functions.

In architecture 1b, information carried on the adaptation layer supports the following functions:
- Routing across the wireless backhaul topology;
- QoS-enforcement by the scheduler on DL and UL on the wireless backhaul link;
- Mapping of UE user-plane PDUs to backhaul RLC channels;
- Potentially other functions.

In case the IAB-node is connected via multiple paths, different identifiers (e.g. route ID, IAB node address) in the adaptation layer will be associated with the different paths, enabling adaptation layer routing on the different paths. The different paths can be associated with different backhaul RLC-channels.

Content Carried on the Adaptation Layer Header

The study identifies information to be carried on the adaptation layer header. This may include:
- UE-bearer-specific Id;
- UE-specific Id;
- Route Id, IAB-node or IAB-donor address;
- QoS information;
- Potentially other information.

IAB-nodes will use the identifiers carried via Adapt to ensure required QoS treatment and to decide which hop a packet should be sent to. A brief overview is provided below on how the above information may be used to this end, if included in the final design of Adapt.

The UE-bearer-specific Id may be used by the IAB-node and the IAB-donor to identify the PDU's UE-bearer. UE's access IAB-node would then map Adapt information (e.g. UE-specific ID, UE-bearer specific ID) into the corresponding C-RNTI and LCID. The IAB-donor DU may also need to map Adapt information into the F1-U GTP-U TEID used between Donor DU and Donor CU.

UE-bearer-specific Id, UE-specific Id, Route Id, or IAB-node/IAB-donor address may be used (in combination or individually) to route the PDU across the wireless backhaul topology.

UE-bearer-specific Id, UE-specific Id, UE's access node IAB ID, or QoS information may be used (in combination or individually) on each hop to identify the PDU's QoS treatment. The PDU's QoS treatment may also be based on the LCID.

Processing of Adaptation Layer Information

The study identifies, which of the information on the adaptation layer is processed to support the above functions on each on-path IAB-node (hop-by-hop); and/or on the UE's access-IAB-node and the IAB-donor (end-to-end).

Integration of Adaptation Layer into L2 Stack

Figure 8:
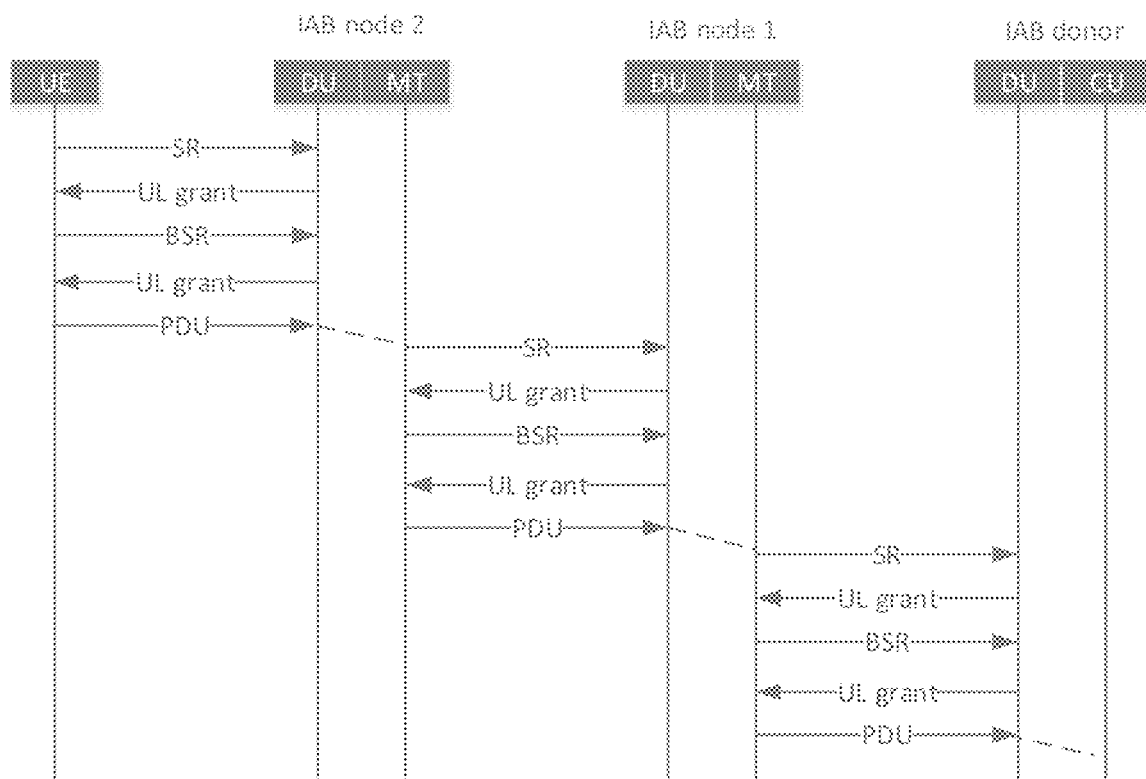
FIG. 8 is a reproduction of FIG. 8.6-1 of 3GPP TR 38.874 V16.0.0.

The study considers the following adaptation layer placements:
- integrated with MAC layer or placed above MAC layer (examples shown in FIG. 8.2.1-1a, b);
- above RLC layer (examples shown in FIG. 8.2.1-1c, d, e and FIG. 8.2.1-2).

For 1:1 mapping of UE-bearers to backhaul RLC-channels (see section 8.2.4), Adapt can be integrated with the MAC layer or placed above the MAC layer. A separate RLC-entity in each IAB-node is provided for each of these backhaul RLC-channels. Arriving PDUs are mapped to the corresponding RLC-entity based on the UE-bearer information carried by Adapt.

When UE-bearers are aggregated to backhaul RLC-channels (e.g. based on QoS-profile (see section 8.2.4)), Adapt can be placed above the RLC layer.

For both Adapt above RLC and Adapt above MAC, when UE bearers are aggregated to logical channels, the logical channel can be associated to a QoS profile. The number of QoS-profiles supported is limited by the LCID-space.

The figures show example protocol stacks and do not preclude other possibilities. While RLC channels serving for backhauling include the adaptation layer, the adaptation layer may or may not be included in IAB-node access links.

Adaptation Header Structure

The adaptation layer may consist of sublayers. It is perceivable, for example, that the GTP-U header becomes a part of the adaptation layer. It is also possible that the GTP-U header is carried on top of the adaptation layer to carry end-to-end association between the IAB-node DU and the CU (example is shown in FIG. 8.2.1-1d).

Alternatively, an IP header may be part of the adaptation layer or carried on top of the adaptation layer. One example is shown in FIG. 8.2.1-1e. In this example, the IAB-donor DU holds an IP routing function to extend the IP-routing plane of the fronthaul to the IP-layer carried by adapt on the wireless backhaul. This allows native F1-U to be established end-to-end, i.e. between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul.

Note that the IP-layer on top of Adapt does not represent a PDU session. The MT's first hop router on this IP-layer therefore does not have to hold a UPF.

Observations on Adaptation Layer Placement

1. The above-RLC adaptation layer can only support hop-by-hop ARQ. The above-MAC adaptation layer can support both hop-by-hop and end-to-end ARQ.
2. Both adaptation layer placements can support aggregated routing, e.g. by inserting an IAB-node address into the adaptation header.
3. UE-specific ID may be a completely new identifier or one of the existing identifiers can be reused. The identifier(s) included in Adapt may vary depending on the adaptation layer placement.
4. Both adaptation layer placements can support per-UE-bearer QoS treatment. In order for each UE bearer to receive individual QoS support when their number exceeds the size of the LCID space, one possible solution is the extension of the LCID-space which can be achieved through changes to the MAC sub-header, or by dedicated information placed in the Adapt header. Enhancements to BSR reporting may be required.
5. Both adaptation layer placements can support aggregated QoS handling as in the following example network configurations.
    a. For above-RLC adaptation layer, UE-bearers with same QoS profile could be aggregated to one backhaul RLC-channel for this purpose.
    b. For above-MAC or integrated-with-MAC adaptation layer, UE-bearers with same QoS profile could be treated with same priority by the scheduler.

6. For both adaptation layer placements, aggregation of routing and QoS handling allows proactive configuration of intermediate on-path IAB-nodes, i.e. configuration is independent of UE-bearer establishment/release.
7. For both adaptation layer placements, RLC ARQ can be pre-processed on TX side.
[ . . . ]

8.6 Latency in UL Scheduling

Increased latency due to multiple hops in an IAB network can adversely impact the performance of both control plane procedures (such as handover and radio link recovery) and also user plane data transmission. In order to achieve hop agnostic performance in IAB scheduling, it is important to reduce the E2E delay from the UE to the IAB-donor, and meet the latency requirement, regardless of how many hops the UE is away from the IAB-donor.

In multi-hop networks, upstream data arriving from a child node may suffer scheduling delays at the parent node and intermediate nodes. To some extent, this is no different from a single-hop UE where new data arrives into UE buffers after a BSR is sent. However, in a multi-hop network, the delays are likely to accumulate due to number of hops and aggregated volume of data at IAB-nodes and may require mitigation mechanisms. Request of uplink resources at each hop and UL data transmission are shown in FIG. 8.6-1.

FIG. 8.6-1 of 3GPP TR 38.874 V16.0.0, Entitled "Uplink Delays in IAB Network: Worst Case Scenario, where None of the Intermediate Nodes have any UL Resources Allocated to Them", is Reproduced as FIG. 8

It is clear that this process can be significantly longer than the corresponding process in one-hop networks, due to the multiple consecutive uplink resource request and allocation steps. The underlying reason for these delays is that the MT part of an IAB-node can only request uplink resources for the UL data transmission after it actually receives the data to be transmitted.

One approach to mitigate such delays consists of initiating an uplink resource request at an IAB-node based on data that is expected to arrive. This would enable the IAB-node to obtain the uplink resource prior to actual data reception from its child IAB-node or a UE that it serves.

The details of the content and triggers of the SR/BSR and UL scheduling are left for the WI phase.

In NR, the procedures related to Scheduling Request (SR)/Buffer Status Report (BSR) are specified in 3GPP TS 38.321 and provided below as a starting point for further enhancement.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

RRC configures the following parameters for the scheduling request procedure:
  sr-ProhibitTimer (per SR configuration);
  sr-TransMax (per SR configuration).
The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see subclause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:
  1> if the MAC entity has no valid PUCCH resource configured for the pending SR:
    2> initiate a Random Access procedure (see subclause 5.1) on the SpCell and cancel the pending SR.
  1> else, for the SR configuration corresponding to the pending SR:
    2> when the MAC entity has an SR transmission occasion on the valid PUCCH resource for SR configured; and
    2> if sr-ProhibitTimer is not running at the time of the SR transmission occasion; and
    2> if the PUCCH resource for the SR transmission occasion does not overlap with a measurement gap; and
    2> if the PUCCH resource for the SR transmission occasion does not overlap with a UL-SCH resource:
      3> if SR_COUNTER<sr-TransMax:
        4> increment SR_COUNTER by 1;
        4> instruct the physical layer to signal the SR on one valid PUCCH resource for SR;
        4> start the sr-ProhibitTimer.
      3> else:
        4> notify RRC to release PUCCH for all Serving Cells;
        4> notify RRC to release SRS for all Serving Cells;
        4> clear any configured downlink assignments and uplink grants;
        4> clear any PUSCH resources for semi-persistent CSI reporting;
        4> initiate a Random Access procedure (see subclause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.
NOTE 2: If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see subclause 5.4.5) prior to the MAC PDU assembly, or when the UL grant(s) can accommodate all pending data available for transmission.
[ . . . ]

5.4.5 Buffer Status Reporting

The Buffer Status reporting (BSR) procedure is used to provide the serving gNB with information about UL data volume in the MAC entity.

RRC configures the following parameters to control the BSR:
periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
UL data, for a logical channel which belongs to an LCG, becomes available to the MAC entity; and either
this UL data belongs to a logical channel with higher priority than the priority of any logical channel containing available UL data which belong to any LCG; or
none of the logical channels which belong to an LCG contains any available UL data.
in which case the BSR is referred below to as 'Regular BSR';
UL resources are allocated and number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.
NOTE: When Regular BSR triggering events occur for multiple logical channels simultaneously, each logical channel triggers one separate Regular BSR.

For Regular BSR, the MAC entity shall:
1> if the BSR is triggered for a logical channel for which logicalChannelSR-DelayTimerApplied is configured by upper layers:
2> start or restart the logicalChannelSR-DelayTimer.
1> else:
2> if running, stop the logicalChannelSR-DelayTimer.

For Regular and Periodic BSR, the MAC entity shall:
1> if more than one LCG has data available for transmission when the MAC PDU containing the BSR is to be built:
2> report Long BSR for all LCGs which have data available for transmission.
1> else:
2> report Short BSR.

For Padding BSR:
1> if the number of padding bits is equal to or larger than the size of the Short BSR plus its subheader but smaller than the size of the Long BSR plus its subheader:
2> if more than one LCG has data available for transmission when the BSR is to be built:
3> if the number of padding bits is equal to the size of the Short BSR plus its subheader:
4> report Short Truncated BSR of the LCG with the highest priority logical channel with data available for transmission.
3> else:
4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2> else:
3> report Short BSR.
1> else if the number of padding bits is equal to or larger than the size of the Long BSR plus its subheader:
2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set to false; or
3> if the UL-SCH resources available for a new transmission do not meet the LCP mapping restrictions (see subclause 5.4.3.1) configured for the logical channel that triggered the BSR:
4> trigger a Scheduling Request.
NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

[ . . . ]

6.1.3 MAC Control Elements (CEs)
6.1.3.1 Buffer Status Report MAC CEs

Buffer Status Report (BSR) MAC CEs consist of either:
Short BSR format (fixed size); or
Long BSR format (variable size); or
Short Truncated BSR format (fixed size); or
Long Truncated BSR format (variable size).

The BSR formats are identified by MAC PDU subheaders with LCIDs as specified in Table 6.2.1-2.

The fields in the BSR MAC CE are defined as follows:

LCG ID: The Logical Channel Group ID field identifies the group of logical channel(s) whose buffer status is being reported. The length of the field is 3 bits;

$LCG_i$: For the Long BSR format, this field indicates the presence of the Buffer Size field for the logical channel group i. The $LCG_i$ field set to "1" indicates that the Buffer Size field for the logical channel group i is reported. The $LCG_i$ field set to "0" indicates that the Buffer Size field for the logical channel group i is not reported. For the Long Truncated BSR format, this field indicates whether logical channel group i has data available. The $LCG_i$ field set to "1" indicates that logical channel group i has data available. The $LCG_i$ field set to "0" indicates that logical channel group i does not have data available;

Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively.

For the Long BSR format and the Long Truncated BSR format, the Buffer Size fields are included in ascending order based on the $LCG_i$. For the Long Truncated BSR format the number of Buffer Size fields included is maximised, while not exceeding the number of padding bits.

NOTE: The number of the Buffer Size fields in the Long BSR and Long Truncated BSR format can be zero.

Figure 9:
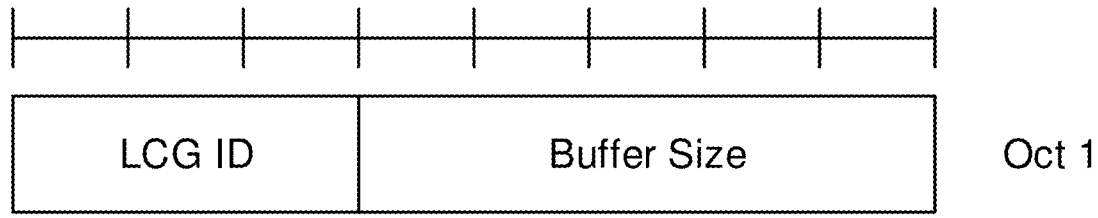
FIG. 9 is a reproduction of FIG. 6.1.3.1-1 of 3GPP TS 38.321 V15.4.0.

FIG. 6.1.3.1-1 of 3GPP TS 38.321 V15.4.0, Entitled "Short BSR and Short Truncated BSR MAC CE", is Reproduced as FIG. 9

Figure 10:
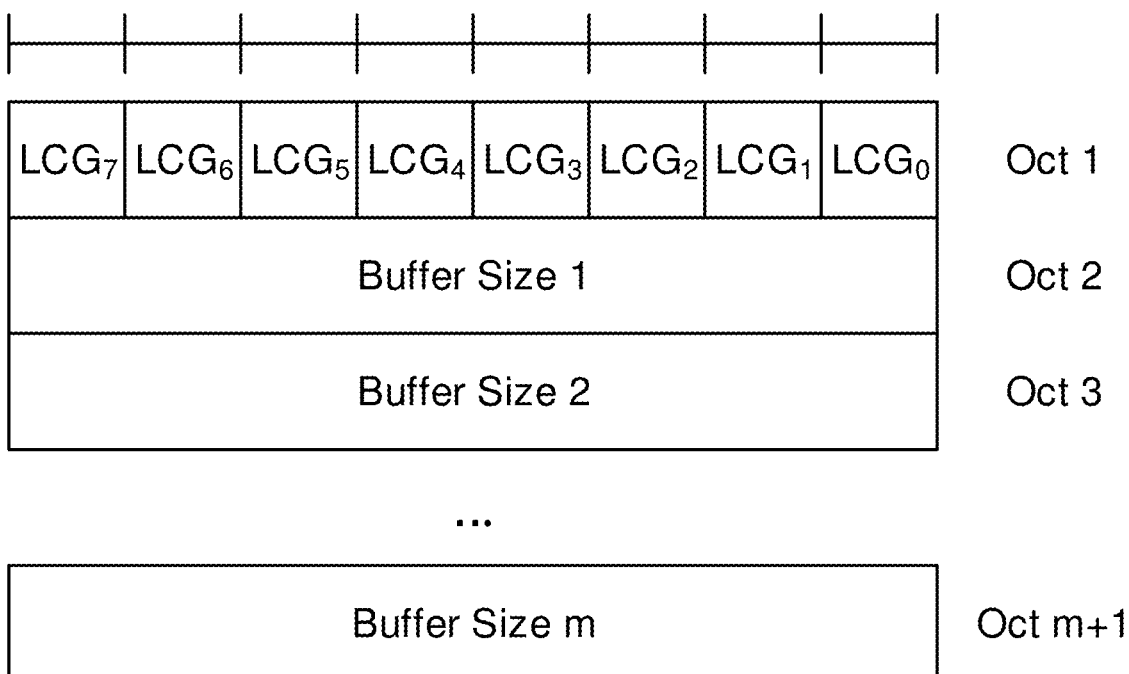
FIG. 10 is a reproduction of FIG. 6.1.3.1-2 of 3GPP TS 38.321 V15.4.0.

FIG. 6.1.3.1-2 of 3GPP TS 38.321 V15.4.0, Entitled "Long BSR and Long Truncated BSR MAC CE", is Reproduced as FIG. 10

Table 6.1.3.1-1 of 3GPP TS 38.321 V15.4.0, Entitled "Buffer Size Levels (in Bytes) for 5-Bit Buffer Size Field", is Reproduced as FIG. 11

Table 6.1.3.1-2 of 3GPP TS 38.321 V15.4.0, Entitled "Buffer Size Levels (in Bytes) for 8-Bit Buffer Size Field", is Reproduced as FIGS. 12A and 12B

[ . . . ]

6.2.1 MAC Subheader for DL-SCH and UL-SCH

The MAC subheader consists of the following fields:

LCID: The Logical Channel ID field identifies the logical channel instance of the corresponding MAC SDU or the type of the corresponding MAC CE or padding as described in Tables 6.2.1-1 and 6.2.1-2 for the DL-SCH and UL-SCH respectively. There is one LCID field per MAC subheader. The LCID field size is 6 bits;

L: The Length field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field;

F: The Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field;

R: Reserved bit, set to "0".

The MAC subheader is octet aligned.

Table 6.2.1-1 of 3GPP TS 38.321 V15.4.0, Entitled "Values of LCID for DL-SCH", is Reproduced as FIG. 13

Table 6.2.1-2 of 3GPP TS 38.321 V15.4.0, Entitled "Values of LCID for UL-SCH", is Reproduced as FIG. 14

[ . . . ]

5.4.3.1.3 Allocation of Resources

The MAC entity shall, when a new transmission is performed:

1> allocate resources to the logical channels as follows:
2> logical channels selected in clause 5.4.3.1.2 for the UL grant with Bj>0 are allocated resources in a decreasing priority order. If the PBR of a logical channel is set to infinity, the MAC entity shall allocate resources for all the data that is available for transmission on the logical channel before meeting the PBR of the lower priority logical channel(s);

2> decrement Bj by the total size of MAC SDUs served to logical channel j above;

2> if any resources remain, all the logical channels selected in clause 5.4.3.1.2 are served in a strict decreasing priority order (regardless of the value of Bj) until either the data for that logical channel or the UL grant is exhausted, whichever comes first. Logical channels configured with equal priority should be served equally.

NOTE: The value of Bj can be negative.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data;

if the MAC entity is given a UL grant size that is equal to or larger than 8 bytes while having data available and allowed (according to clause 5.4.3.1) for transmission, the MAC entity shall not transmit only padding BSR and/or padding.

The MAC entity shall not generate a MAC PDU for the HARQ entity if the following conditions are satisfied:

the MAC entity is configured with skipUplinkTxDynamic with value true and the grant indicated to the HARQ entity was addressed to a C-RNTI, or the grant indicated to the HARQ entity is a configured uplink grant; and there is no aperiodic CSI requested for this PUSCH transmission as specified in TS 38.212 [9]; and the MAC PDU includes zero MAC SDUs; and the MAC PDU includes only the periodic BSR and there is no data available for any LCG, or the MAC PDU includes only the padding BSR.

Logical channels shall be prioritised in accordance with the following order (highest priority listed first):

C-RNTI MAC CE or data from UL-CCCH;

Configured Grant Confirmation MAC CE;

MAC CE for BSR, with exception of BSR included for padding;

Single Entry PHR MAC CE or Multiple Entry PHR MAC CE;

data from any Logical Channel, except data from UL-CCCH;

MAC CE for Recommended bit rate query;

MAC CE for BSR included for padding.

According to the definitions in 3GPP TR 38.874, IAB-node is generally a RAN node that supports wireless access to UEs and wirelessly backhauls the access traffic, and IAB-donor is a RAN node which provides UE's interface to core network and wireless backhauling functionality to IAB nodes. The IAB-node may also be referred to as a Relay Transmission/Reception Point (rTRP), a relay, or a wireless transmission/reception unit (WTRU). The IAB-donor may also be referred to as the anchor node. The IAB-donor may be a gNB or part of a gNB, or may include at least part of a gNB, with additional functionality to support IAB.

Each IAB-node may include Mobile-Termination (MT) part and network (NW) part. The MT part of the IAB-node has at least part of the functionalities that typical user equipment (UE) should have and the NW part of the IAB-node has at least part of the functionalities that typical network node (e.g. gNB) should have.

When a first IAB-node acts as a UE through its MT part to another second IAB-node (or to an IAB-donor), the first IAB-node may be referred to as a child node of the second IAB-node (or a child node of the IAB-donor). When a third IAB-node acts as a network node through its NW part to another fourth IAB-node (or to an UE), the third IAB-node may be referred to as a parent node of the fourth IAB-node (or a parent node of the UE).

Downlink (DL) IAB transmissions include the transmissions on backhaul links from a parent node to its child node, and may include the transmissions on access links from an IAB-node to UEs, which are served by the IAB-node. Uplink (UL) IAB transmissions include the transmissions on backhaul links from a child node to its parent node or IAB-donor.

The backhaul link could be in-band or out-of-band with respect to the access link, depending on whether the backhaul link and the access link are at least partially overlapped in frequency or not. In-band backhauling creates half-duplexing or interference constraints, which implies that the IAB-node cannot transmit and receive simultaneously on both links.

An IAB-node could be physically fixed (e.g. its location is fixed) or mobile (e.g. on buses or trains).

Agreements made in the 3GPP RAN2 #104 meeting with respect to user plane aspects of "Study on Integrated Access and Backhaul for NR" are captured in the RAN2 #104 meeting minutes as follows:

| Agreements |
| --- |
| We go for the consolidated example 1, "adapt above RLC" + "LCID ext" |
| We keep LCID extension in the solution description, as this is a method to achieve 1:1 mapping |
| Confirm that UE is not expected to need to implement the LCID extension |
| Only Hop-by-hop ARQ in Rel-16 |
| The Rel.16 IAB WI focuses on only "IP termination at Access IAB node" |
| Confirm that GTP-U is included in the UP stack for F1-U |

Agreements made in the 3GPP RAN2 #107bis meeting with respect to user plane aspects of "Integrated Access and Backhaul for NR" are captured in the RAN2 #107bis meeting minutes as follows:

Confirmation that this is the expected enhanced behavior:
Following the reception by the second (parent) node of a BSR from a first (child) node, resources may be requested from the third node (parent of second node) before actual data arrives from the first node Agreements made in the 3GPP RAN2 #108 meeting with respect to user plane aspects of "Integrated Access and Backhaul for NR" [9] are captured in the RAN2 #108 meeting minutes as follows:

We specify a new BSR (with a new format), for pre-emptive BSR.

For the new BSR
  differentiate in BSR available data (as today) and expected data.
  Associating a LCH with pre-emptive BSR is left to implementation, unless issues are identified requiring normative solutions.
  FFS if SR and BSR generated by a MAC entity need or can only be reported to the parent node where the peer of that MAC entity resides.
  On Triggering of pre-emptive BSR, can capture some text similar to the current agreements, in stage-3/2.
  Exact timing etc is up to implementation.

3GPP R2-1916537 is the way forward text proposal for the pre-emptive BSR modification on MAC specification. The modified contents are as follows:

If configured, a BSR may also be triggered for the specific case of an IAB-MT if any of the following events occur:
  UL grant is provided to child IAB node or UE;
  BSR is received from child IAB node or UE.
  This BSR is referred as "pre-emptive" BSR and is treated as Regular BSR for the purposes of SR triggering.
  [ . . . ]
  Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the $LCG_1$. For the Long Truncated BSR format the number of Buffer Size fields included is maximised, while not exceeding the number of padding bits. For the pre-emptive BSR, the Buffer Size field identifies the total amount of the data expected to arrive at the node where the pre-emptive BSR is triggered.
  NOTE: For the pre-emptive BSR, if configured, the LCGs to be reported, the expected data volume calculation, the exact time to report pre-emptive BSR and the associated LCH are left to implementation.

In the 3GPP RAN2 #108 meeting, the above text proposal was endorsed as baseline except for the format which is FFS.

According to FIG. 8, in a multi-hop network, the scheduling delays suffering for the uplink data are likely to accumulate due to number of hops and may require mitigation mechanisms. FIG. 8 is a reproduction of FIG. 8.6-1 of TR 38.874 V16.0.0, entitled "Uplink Delays in IAB Network: worst case scenario, where none of the intermediate nodes have any UL resources allocated to them".

As the analysis mentioned in subclause 8.6 of 3GPP TR 38.874, the underlying reason for these delays is that the MT part of an IAB-node, which has at least part of the functionalities that typical UE should have, follows the specifications for typical UE, which can only request uplink resources for the UL data transmission after it actually receives the data to be transmitted, based on the current NR MAC specification, 3GPP TS 38.321.

Also mentioned in subclause 8.6 in 3GPP TR 38.874, one approach to mitigate such delays consists of initiating an uplink resource request at an IAB-node based on data that is expected to arrive and this would enable IAB-node to obtain uplink resource prior to actual data reception from its child node, which may be another IAB-node or a UE, that it serves.

Up to now, the current NR MAC specification, 3GPP TS 38.321, considers the uplink traffic originated from UE as the UE "self-generated" uplink traffic. It may imply that even if a flow of uplink traffic originated from UE is in fact transferred from other device to the UE, the UE still treat it the same as the UE "self-generated" uplink traffic. The treatment has characteristic that the uplink traffic originated from UE is handled only after the uplink traffic has arrived to the UE and has been known by the UE, like the uplink traffic is generated by the UE itself. When the uplink traffic has arrived to the UE and has been known by the UE, the status of the uplink traffic is already available for uplink transmission. This kind of behavior causes the scheduling delay. However, as discussed in the analysis above, when there is only one hop from UE to gNB, there is no such accumulation of scheduling delays due to multiple hops.

Different from UE, for an IAB-node, the uplink traffic originated from IAB-node may be "self-generated" by the IAB-node itself, and/or may be "child node-delivered" to the IAB-node from its child node. Since IAB-node is designed to be the relay, the "child node-delivered" uplink traffic may be the major part of the uplink traffic originated from IAB-node. As the analysis mentioned above, in order to mitigate the accumulated scheduling delays due to multiple hops, the approach of initiating an uplink resource request by the IAB-node based on data that is expected to arrive may be applied. It may imply that the "child node-delivered" uplink traffic originated from IAB-node may be handled before the uplink traffic has arrived to the IAB-node but has been known by the IAB-node. The treatment for the "child node-delivered" uplink traffic should be different from the treatment for the 'self-generated' uplink traffic. When the "child node-delivered" uplink traffic has been known by the IAB-node but has not yet arrived to the IAB-node, the status of the uplink traffic is "expected to arrive". Therefore, from the IAB-node's point of view, the IAB-node "child node-delivered" uplink traffic may have two stages, which are "expected to arrive" when the uplink traffic has been known by the IAB-node but has not yet arrived to the IAB-node and "already received" (i.e. already available for uplink transmission) when the uplink traffic has arrived to the IAB-node and has been known by the IAB-node.

It is possible to assume that the IAB-node "self-generated" uplink traffic is handled the same as the UE "self-generated" uplink traffic by original mechanism of current NR MAC specification, and the approach to mitigate the accumulated scheduling delays is applied to the IAB-node "child node-delivered" uplink traffic, which has the stages of "expected to arrive" and "already received". The stage of "already received" of the IAB-node "child node-delivered" uplink traffic is the same as "already available for uplink transmission" of the IAB-node "self-generated" uplink traffic.

Based on the above description, in order to mitigate the accumulated scheduling delays due to multiple hops, an IAB-node may initiate an uplink resource request based on the "child node-delivered" uplink traffic that is "expected to arrive". The child node of the IAB-node may be a UE or another IAB-node.

It is possible to assume that the IAB-node depends on the reception of BSR from child node to know the estimated and/or rough volume of the "child node-delivered" uplink traffic that is "expected to arrive". It is also possible to assume that the IAB-node triggers a new kind of BSR as the uplink resource request, during the "expected to arrive" stage of the "child node-delivered" uplink traffic, in order to mitigate the accumulated scheduling delays due to multiple hops. The new kind of BSR may be different from the BSR defined in the NR MAC specification (3GPP TS 38.321). The BSR triggered based on data expected to arrive may be called pre-emptive BSR. The BSR triggered based on data actually received or data already available for uplink transmission may be called normal BSR.

As specified in Section 5.4.5 of the current MAC specification (3GPP TS 38.321), the three different kinds of BSR (i.e. the Regular BSR, the Periodic BSR, and the Padding BSR) have different characteristics. The pre-emptive BSR may be a Regular BSR. The pre-emptive BSR may not be a Regular BSR. The pre-emptive BSR may not be a Periodic BSR. The pre-emptive BSR may not be a Padding BSR. The normal BSR may be a Regular BSR. The normal BSR may be a Periodic BSR. The normal BSR may not be a Periodic BSR. The normal BSR may not be a Padding BSR. The triggering conditions of the Periodic BSR and the Padding BSR may be kept the same as which are specified in Section 5.4.5 of the current MAC specification (3GPP TS 38.321).

The pre-emptive BSR for IAB-node may be triggered without data in "actually received" stage or already available for uplink transmission in the IAB-node. The report content corresponding to the pre-emptive BSR for IAB-node may indicate data amount (or buffer size to be reported in BSR MAC CE) including the data expected to arrive but not including the data already available. Alternatively or additionally, the pre-emptive BSR may indicate the data "expected to arrive" (if any) and the data "actually received" for uplink transmission, either jointly or separately.

Based on the description above, it is possible to have a scenario as following. An IAB-node receives a BSR from its child node. The BSR may be a normal BSR if the child node is UE. The BSR may be an pre-emptive BSR or a normal BSR if the child node is another IAB-node. After receiving the BSR from the child node, the IAB-node may trigger its pre-emptive BSR based on data "expected to arrive." The pre-emptive BSR may be indicated according to the received BSR from its child node.

According to the RAN2 #108 meeting minutes, a new BSR is defined for pre-emptive BSR and the new BSR differentiate in BSR available data (as today) and expected data. According to 3GPP R2-1916537, "[f] or the pre-emptive BSR, the Buffer Size field identifies the total amount of the data expected to arrive at the node where the pre-emptive BSR is triggered". See 3GPP R2-1916537, Page 4.

Figure 15:
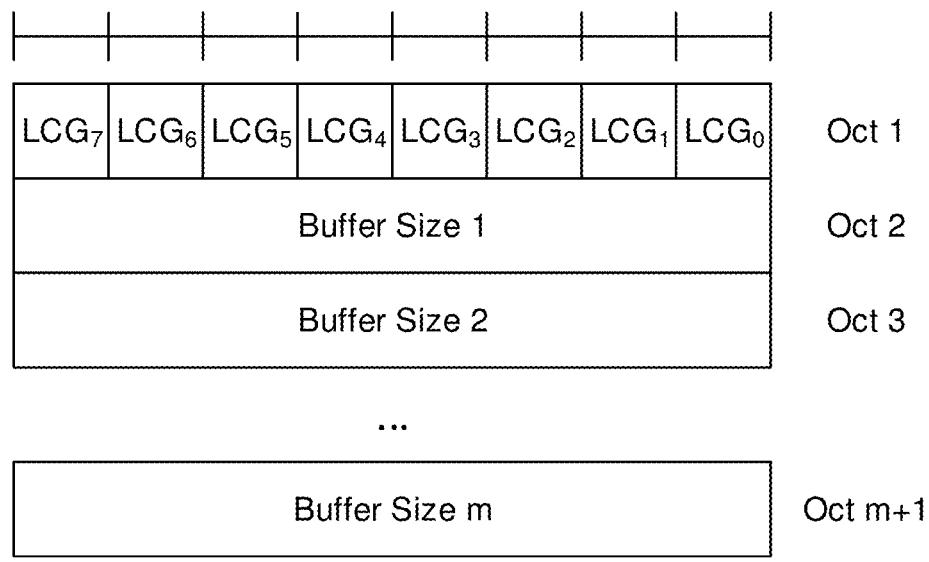
FIG. 15 is a reproduction of FIG. 6.1.3.1-2 of 3GPP R2-1916537.

FIG. 15 is a reproduction of FIG. 6.1.3.1-2 of 3GPP R2-1916537, entitled "Long BSR, Long Truncated BSR and pre-emptive BSR MAC CE". Although the format of the new BSR is still for further study (FFS), according to 3GPP R2-1916537 with the possible format of the new pre-emptive BSR MAC CE shown in FIG. 15, it may be assumed that the new BSR reports amount of the data "expected to arrive" but not the data available for transmission. In addition, the normal or traditional BSR reports amount of the data 'already available' but not the data expected to arrive, which has the same function as it works now (e.g. as what specified in 3GPP TS 38.321).

Moreover, according to current MAC specification (3GPP TS 38.321), "[a] MAC PDU shall contain at most one BSR MAC CE, even when multiple events have triggered a BSR". See 3GPP TS 38.321, Page 35. It means that a MAC PDU could either contain a pre-emptive BSR (which reports amounts of data expected to arrive) or a normal BSR (which reports amounts of data available for transmission) but not both. However, this may cause the problem that only one type of BSR, the new pre-emptive BSR or the normal or traditional BSR, can be included in one MAC PDU, even if both types of BSR, the new pre-emptive BSR and the normal/traditional BSR, are triggered or needed to be reported. This may cause the delay for parent node to know the UL resource request from child node.

For example, an IAB-node may trigger a pre-emptive BSR, e.g. in response to reception of a BSR from its child node, or in response to providing a UL grant to its child node. After some data to be forwarded to a parent node is arrived, a normal BSR (e.g. a Regular BSR other than a pre-emptive BSR) may be triggered, e.g. due to UL data belonging to a logical channel with higher priority than the priority of any logical channel containing available UL data which belong to any LCG, or none of the logical channels which belong to any LCG contains any available UL data. In this case, both pre-emptive BSR and normal BSR are triggered (or pending) and needed to be reported.

For example, an IAB-node may trigger a pre-emptive BSR, e.g. in response to reception of a BSR from its child node, or in response to providing a UL grant to its child node. In the meantime, there are already some UL data available for transmission and therefore a normal BSR (e.g. a Regular BSR other than a pre-emptive BSR) is pending. The normal BSR may be triggered by UL data belonging to a logical channel with higher priority than the priority of any logical channel containing available UL data which belong to any LCG, or none of the logical channels which belong to any LCG contains any available UL data. In this case, both pre-emptive BSR and normal BSR are triggered (or pending) and needed to be reported.

To solve the issue, a MAC PDU is allowed to include multiple BSR MAC CEs, e.g. a first BSR and a second BSR. The first BSR may be a Regular BSR. The second BSR may be a Regular BSR. The first BSR may be a pre-emptive BSR. The second BSR may be a normal BSR (e.g. a Regular BSR other than a pre-emptive BSR). The first BSR and/or the second BSR may not be a Sidelink BSR (SL-BSR).

An IAB-node may generate and/or transmit a MAC PDU including the first BSR and the second BSR. The MAC PDU may be transmitted using a UL grant scheduled by a parent node of the IAB-node. The UL grant may accommodate at least two BSR MAC CEs. A pre-emptive BSR may be triggered and not cancelled. The pre-emptive BSR may be triggered due to a BSR is received from its child node. The pre-emptive BSR may be triggered due to providing a UL grant to its child node. A normal BSR may be triggered and not cancelled. The normal BSR may be triggered due to UL data belonging to a logical channel with higher priority than the priority of any logical channel containing available UL data which belong to any LCG. The normal BSR may be triggered due to none of the logical channels which belong to any LCG contains any available UL data.

For example, an IAB-node may trigger a pre-emptive BSR. The IAB-node may trigger a normal BSR. The pre-emptive BSR may be triggered before the normal BSR is triggered. Alternatively, the normal BSR may be triggered before the pre-emptive BSR is triggered. The IAB-node may receive a UL grant when both the pre-emptive BSR and the normal BSR is pending (e.g. triggered and not cancelled). The IAB-node may use the UL grant to transmit a MAC PDU including a first BSR MAC CE and a second BSR MAC CE. The first BSR MAC CE may correspond to the pre-emptive BSR. The second BSR MAC CE may correspond to the normal BSR.

In one example, a MAC PDU contains at most one BSR MAC CE corresponding to a pre-emptive BSR and one BSR MAC CE corresponding to a normal BSR. If a normal BSR is triggered multiple times, at most one BSR MAC CE corresponding to the normal BSR can be included in the MAC PDU.

In one example, the regulation in the MAC specification (3GPP TS 38.321) may be changed from "contain at most one BSR MAC CE" to "contain at most one BSR MAC CE for each type of BSR". More specifically, the normal BSR is considered as a type of BSR, and the new pre-emptive BSR is considered as another type of BSR. More specifically, at most one pre-emptive BSR MAC CE can be contained in one MAC PDU. By this way, one MAC PDU can contain one pre-emptive BSR and one traditional or normal BSR when both types of BSR, the new pre-emptive BSR and the normal/traditional BSR, are needed to be reported.

A potential text proposal to modify the current NR MAC specification (3GPP TS 38.321) is provided below:
A MAC PDU shall contain at most one BSR MAC CE for each type of BSR (i.e. normal BSR and pre-emptive BSR), even when multiple events have triggered a BSR. The Regular BSR and the Periodic BSR shall have precedence over the padding BSR. In another example, the regulation in MAC specification TS 38.321 [2] may be changed from "contain at most one BSR MAC CE" to "contain at most one BSR MAC CE except for the case of pre-emptive BSR". For pre-emptive BSR, a MAC PDU may contain more than one BSR MAC CE (e.g. two BSR MAC CE) and one of them is pre-emptive BSR. More specifically, there is still at most one normal/traditional BSR in one MAC PDU. One or more than one pre-emptive BSR may be included in one MAC PDU.

A potential text proposal to modify the current NR MAC specification (3GPP TS 38.321) is provided below:
A MAC PDU shall contain at most one BSR MAC CE except for the case of pre-emptive BSR, even when multiple events have triggered a BSR. The Regular BSR and the Periodic BSR shall have precedence over the padding BSR. For pre-emptive BSR, a MAC PDU may contain more than one BSR MAC CE (e.g. two BSR MAC CE) and one of them is pre-emptive BSR.

In some cases, for example, if at most one BSR MAC CE can be included in a MAC PDU while a pre-emptive BSR and a normal BSR are both triggered (and not cancelled), which BSR MAC CE is included needs to be considered. To solve the issue, prioritization between a pre-emptive BSR and a normal BSR with respect to the order of inclusion in a MAC PDU needs to be specified (e.g. logical channel prioritization).

In one example, a normal BSR is prioritized over a pre-emptive BSR. If both a pre-emptive BSR and a normal BSR are pending or triggered (and not cancelled), an IAB-node includes a BSR MAC CE for a normal BSR in a MAC PDU before including a BSR MAC CE for a pre-emptive BSR in the MAC PDU.

After receiving a UL grant, an IAB-node may consider what (e.g. which MAC CE, which BSR MAC CE) can be included in a MAC PDU corresponding to the UL grant. The BSR MAC CE for a normal BSR may be included in the MAC PDU. The BSR MAC CE for a pre-emptive BSR may not be included in the MAC PDU. The size of the MAC PDU may be able to accommodate at least two BSR MAC CEs (and corresponding sub-headers).

If a UL grant can accommodate one BSR MAC CE but cannot accommodate two BSR MAC CE, a BSR MAC CE for a normal BSR is included in the MAC PDU corresponding to the UL grant. A BSR MAC CE for a pre-emptive BSR is not included in the MAC PDU corresponding to the UL grant.

A potential text proposal to modify the current NR MAC specification (3GPP TS 38.321) is provided below:
Logical channels shall be prioritised in accordance with the following order (highest priority listed first):
  C-RNTI MAC CE or data from UL-CCCH;
  Configured Grant Confirmation MAC CE;
  MAC CE for BSR, with exception of BSR included for padding and pre-emptive BSR;
  MAC CE for pre-emptive BSR;
  Single Entry PHR MAC CE or Multiple Entry PHR MAC CE;
  data from any Logical Channel, except data from UL-CCCH;
  MAC CE for Recommended bit rate query;
  MAC CE for BSR included for padding.

In another example, a pre-emptive BSR is prioritized over a normal BSR. If both a pre-emptive BSR and a normal BSR are pending or triggered (and not cancelled), an IAB-node includes a BSR MAC CE for a pre-emptive BSR in a MAC PDU before including a BSR MAC CE for a normal BSR in the MAC PDU.

After receiving a UL grant, an IAB-node may consider what (e.g. which MAC CE, which BSR MAC CE) can be included in a MAC PDU corresponding to the UL grant. The BSR MAC CE for a pre-emptive BSR may be included in the MAC PDU. The BSR MAC CE for a normal BSR may not be included in the MAC PDU. The size of the MAC PDU may be able to accommodate at least two BSR MAC CEs (and corresponding sub-headers).

If a UL grant can accommodate one BSR MAC CE but cannot accommodate two BSR MAC CE, a BSR MAC CE for a pre-emptive BSR is included in the MAC PDU corresponding to the UL grant. A BSR MAC CE for a normal BSR is not included in the MAC PDU corresponding to the UL grant.

A potential text proposal to modify the current NR MAC specification (3GPP TS 38.321) is provided below:
Logical channels shall be prioritised in accordance with the following order (highest priority listed first):
  C-RNTI MAC CE or data from UL-CCCH;
  Configured Grant Confirmation MAC CE;
  MAC CE for pre-emptive BSR;
  MAC CE for BSR, with exception of BSR included for padding and pre-emptive BSR;
  Single Entry PHR MAC CE or Multiple Entry PHR MAC CE;
  data from any Logical Channel, except data from UL-CCCH;
  MAC CE for Recommended bit rate query;
  MAC CE for BSR included for padding.

For the case that one normal or traditional BSR and one pre-emptive BSR are triggered, there may be 4 results of what and which is included in a MAC PDU:
  1. both are included;
  2. normal or traditional BSR is included but pre-emptive BSR is not included;
  3. pre-emptive BSR is included but normal or traditional BSR is not included; and
  4. both are not included.

If the triggered normal or traditional BSR or pre-emptive BSR is not included in the MAC PDU, it may be canceled or it may be kept triggered and waits for next opportunity for transmission.

The pre-emptive BSR may be cancelled when a BSR MAC CE for the pre-emptive BSR is included in a MAC PDU. The pre-emptive BSR may not be cancelled when a BSR MAC CE for a normal BSR is included in a MAC PDU. The normal BSR may be cancelled when a BSR MAC CE for the normal BSR is included in a MAC PDU. The normal BSR may not be cancelled when a BSR MAC CE for a pre-emptive BSR is included in a MAC PDU. The pre-emptive BSR may be pending after it is triggered until it is cancelled. The normal BSR may be pending after it is triggered until it is cancelled.

The pre-emptive BSR may include amount (or buffer size) of data expected to arrive. The pre-emptive BSR may not include amount (or buffer size) of data available for transmission. The normal BSR may include amount (or buffer size) of data available for transmission. The normal BSR may not include amount (or buffer size) of data expected to arrive. The amount (or buffer size) of data may be for a LCG.

The first BSR may be a short BSR. The second BSR may be a short BSR. The first BSR may be a long BSR. The second BSR may be a long BSR.

Figure 16:
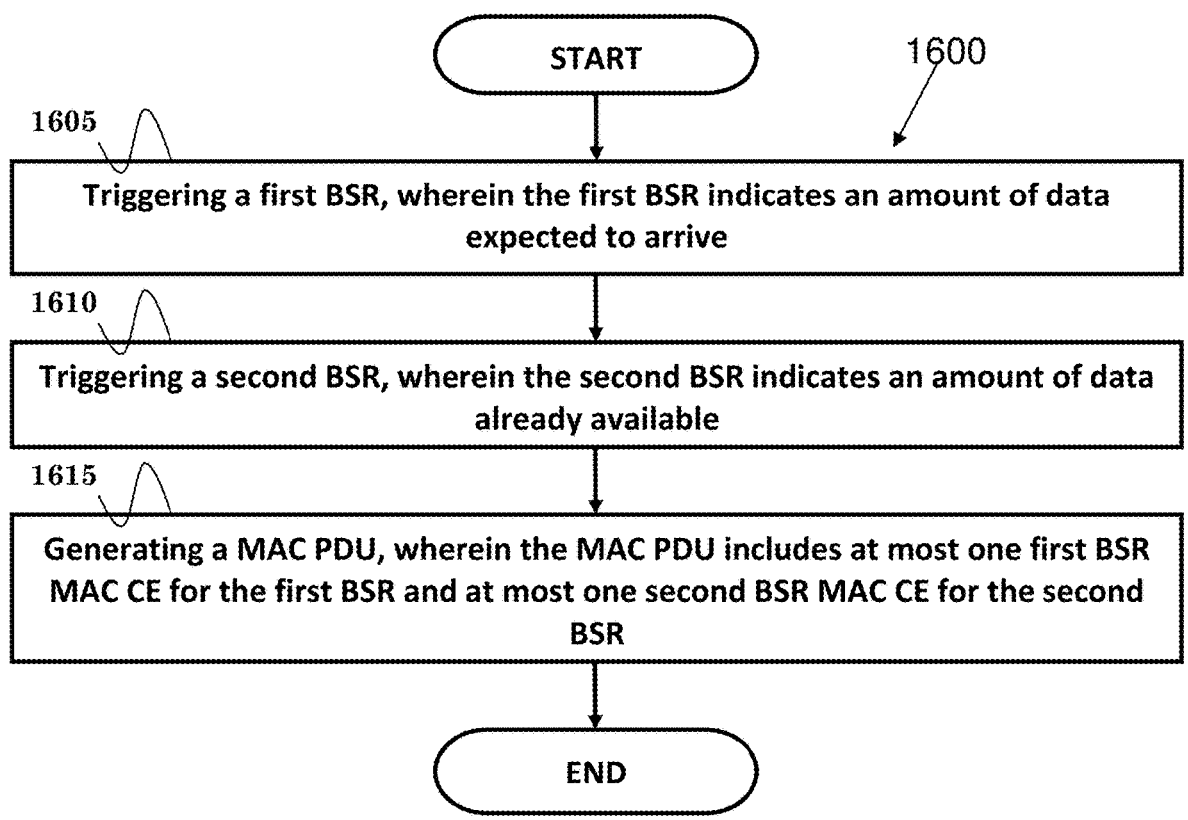
FIG. 16 is a flow chart according to one exemplary embodiment.

FIG. 16 is a flow chart 1600 according to one exemplary embodiment from the perspective of a first WTRU. In step 1605, the first WTRU triggers a first BSR, wherein the first BSR indicates an amount of data expected to arrive. In step 1610, the first WTRU triggers a second BSR, wherein the second BSR indicates an amount of data already available. In step 1615, the first WTRU generates a MAC PDU, wherein the MAC PDU includes at most one first BSR MAC CE for the first BSR and at most one second BSR MAC CE for the second BSR.

In one embodiment, the first BSR may be a Pre-emptive BSR. The second BSR may be a Regular BSR or a Periodic BSR.

In one embodiment, the MAC PDU may include the first BSR MAC CE and the second BSR MAC CE if UL resources for transmitting the MAC PDU are enough to accommodate the first BSR MAC CE and the second BSR MAC CE. The first WTRU could determine if UL resources for transmitting the MAC PDU are enough to accommodate the first BSR MAC CE for the first BSR and the second BSR MAC CE for the second BSR based on a rule which prioritizes the second BSR MAC CE over the first BSR MAC CE on the order of inclusion.

In one embodiment, the MAC PDU may include the second BSR MAC CE, and may not include the first BSR MAC CE if UL resources for transmitting the MAC PDU are not enough to accommodate the first BSR MAC CE based on the rule.

The first WTRU may generate the first BSR MAC CE for the first BSR and the second BSR MAC CE for the second BSR based on the rule. The first WTRU may transmit the MAC PDU to a second WTRU, wherein the second WTRU is a parent node of the first WTRU.

In one embodiment, the MAC PDU generated by the first WTRU could be transmitted using an uplink (UL) grant scheduled by the second WTRU. The first WTRU may be an IAB node.

In one embodiment, the first WTRU could trigger a third BSR, wherein the third BSR is a Regular BSR or a Periodic BSR, and wherein the MAC PDU includes at most one BSR MAC CE for all triggered Regular BSRs and/or Periodic BSRs.

Referring back to FIGS. 3 and 4, in one exemplary embodiment of a first WTRU, the first WTRU 300 includes a program code 312 stored in the memory 310. The CPU 308 could execute program code 312 to enable the first WTRU (i) to trigger a first BSR, wherein the first BSR indicates an amount of data expected to arrive, (ii) to trigger a second BSR, wherein the second BSR indicates an amount of data already available, and (iii) to generate a MAC PDU, wherein the MAC PDU includes at most one first BSR MAC CE for the first BSR and at most one second BSR MAC CE for the second BSR. Furthermore, the CPU 308 can execute the program code 312 to perform all of the above-described actions and steps or others described herein.

Figure 17:
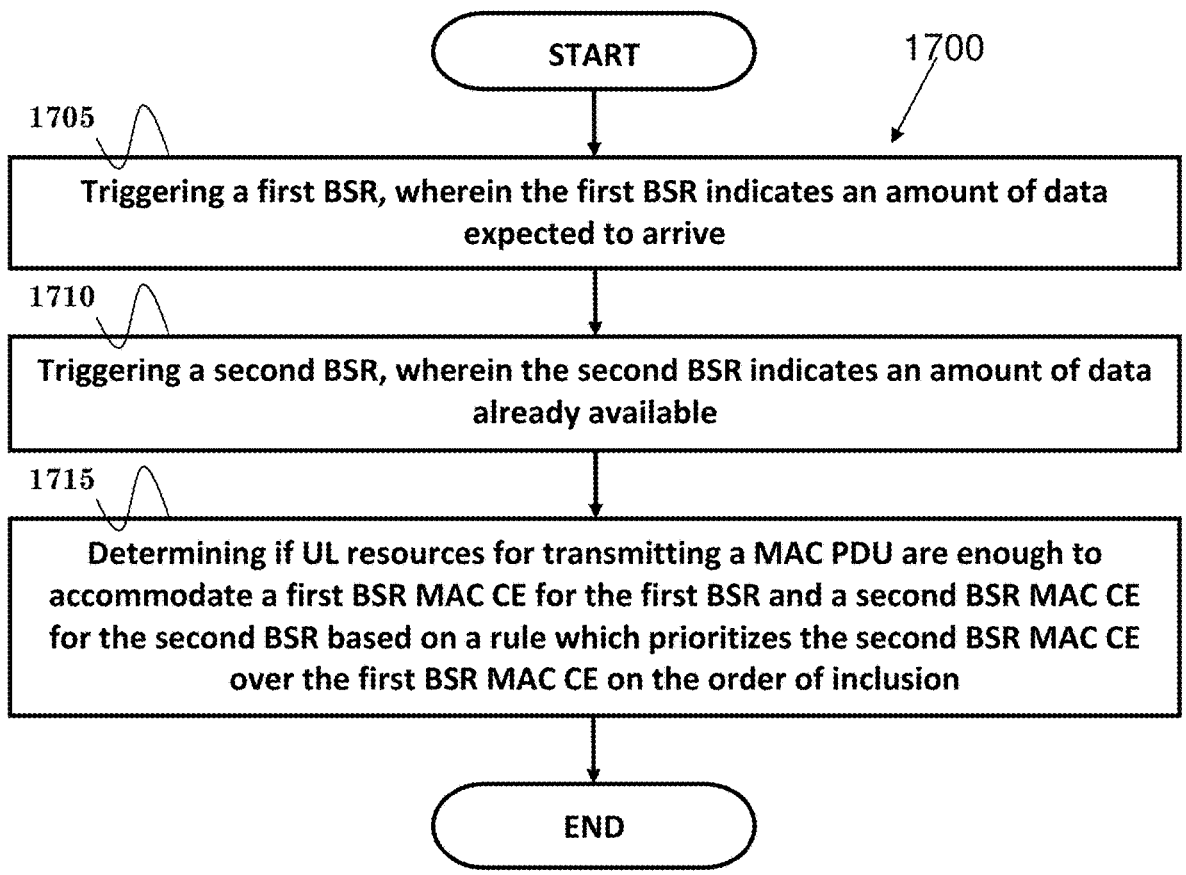
FIG. 17 is a flow chart according to one exemplary embodiment.

FIG. 17 is a flow chart 1700 according to one exemplary embodiment from the perspective of a first WTRU. In step 1705, the first WTRU triggers a first BSR, wherein the first BSR indicates an amount of data expected to arrive. In step 1710, the first WTRU triggers a second BSR, wherein the second BSR indicates an amount of data already available. In step 1715, the first WTRU determines if UL resources for transmitting a MAC PDU are enough to accommodate a first BSR MAC CE for the first BSR and a second BSR MAC CE for the second BSR based on a rule which prioritizes the second BSR MAC CE over the first BSR MAC CE on the order of inclusion.

In one embodiment, the first WTRU could generate the MAC PDU that includes the second BSR MAC CE for the second BSR and does not include the first BSR MAC CE for the first BSR if UL resources for transmitting the MAC PDU are not sufficient to accommodate the first BSR MAC CE based on the rule. The first WTRU could transmit the MAC PDU to a second WTRU, wherein the second WTRU is a parent node of the first WTRU.

In one embodiment, the first WTRU could generate the MAC PDU that includes the first BSR MAC CE and the second BSR MAC CE if UL resources for transmitting the MAC PDU are enough to accommodate the first BSR MAC CE and the second BSR MAC CE.

In one embodiment, the MAC PDU could be allowed to include at most one first BSR MAC CE for the first BSR and at most one second BSR MAC CE for the second BSR. The first WTRU could be an integrated access and backhaul (IAB) node. The first BSR could be a Pre-emptive BSR. The second BSR could be a Regular BSR or a Periodic BSR.

Referring back to FIGS. 3 and 4, in one exemplary embodiment of a first WTRU, the first WTRU 300 includes a program code 312 stored in the memory 310. The CPU 308 could execute program code 312 to enable the first WTRU (i) to trigger a first BSR, wherein the first BSR indicates an amount of data expected to arrive, (ii) to trigger a second BSR, wherein the second BSR indicates an amount of data already available, and (iii) to determine if UL resources for transmitting a MAC PDU are enough to accommodate a first BSR MAC CE for the first BSR and a second BSR MAC CE for the second BSR based on a rule which prioritizes the second BSR MAC CE over the first BSR MAC CE on the order of inclusion. Furthermore, the CPU 308 can execute the program code 312 to perform all of the above-described actions and steps or others described herein.

Figure 18:
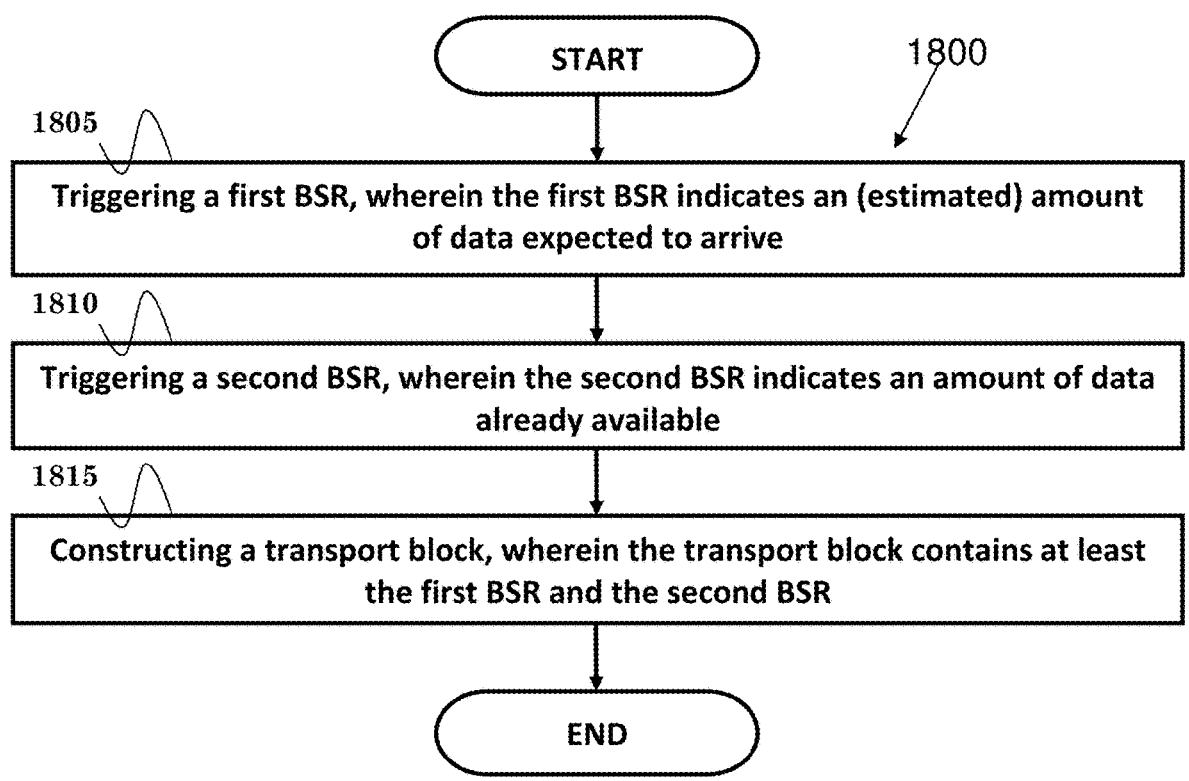
FIG. 18 is a flow chart according to one exemplary embodiment.

FIG. 18 is a flow chart 1800 according to one exemplary embodiment from the perspective of a first WTRU. In step 1805, the first WTRU triggers a first BSR, wherein the first BSR indicates an (estimated) amount of data expected to arrive. In step 1810, the first WTRU triggers a second BSR, wherein the second BSR indicates an amount of data already available. In step 1815, the first WTRU constructs a transport block, wherein the transport block contains at least the first BSR and the second BSR.

In one embodiment, the first WTRU could transmit the transport block to a second WTRU, which is a parent node of the first WTRU (i.e.: the first WTRU is the child node of the second WTRU). The first WTRU could be an IAB-node. The second WTRU could be an IAB-node, or an IAB-donor.

In one embodiment, the transport block could be a MAC PDU. The first BSR and/or the second BSR could be a MAC CE. The first BSR could be a Pre-emptive BSR. The second BSR could be a Regular BSR, or a Periodic BSR, or a Padding BSR.

Referring back to FIGS. 3 and 4, in one exemplary embodiment of a first WTRU, the first WTRU 300 includes a program code 312 stored in the memory 310. The CPU 308 could execute program code 312 to enable the first WTRU (i) to trigger a first BSR, wherein the first BSR indicates an (estimated) amount of data expected to arrive, (ii) to trigger a second BSR, wherein the second BSR indicates an amount of data already available, and (iii) to construct a transport block, wherein the transport block contains at least the first BSR and the second BSR. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first wireless transmit/receive unit (WTRU), comprising:
triggering a first buffer status report (BSR), wherein the first BSR indicates an amount of data expected to arrive from a third WTRU to the first WTRU for uplink transmission to a second WTRU;
triggering a second BSR, wherein the second BSR indicates an amount of data already available at the first WTRU for uplink transmission to the second WTRU; and
transmitting a Medium Access Control (MAC) Protocol Data Unit (PDU) using uplink resources allocated by the second WTRU for uplink transmission, wherein the MAC PDU includes one first BSR MAC Control Element (CE) for the first BSR and one second BSR MAC CE for the second BSR.

2. The method of claim 1, wherein the uplink resources are enough to accommodate both the first BSR MAC CE and the second BSR MAC CE.

3. The method of claim 1, wherein the MAC PDU is allowed to include at most one first BSR MAC CE for the first BSR and at most one second BSR MAC CE for the second BSR, even when multiple events have triggered the first BSR or the second BSR.

4. The method of claim 1, wherein the second WTRU is a parent node of the first WTRU.

5. The method of claim 1, further comprising:
cancelling the first BSR and the second BSR in response to transmitting the MAC PDU.

6. The method of claim 1, wherein the first BSR is a Pre-emptive BSR and the second BSR is a Regular BSR or a Periodic BSR.

7. The method of claim 1, wherein the first WTRU is an integrated access and backhaul (IAB) node, and the third WTRU is a User Equipment (UE) or a child node of the first WTRU.

8. A method for a first wireless transmit/receive unit (WTRU), comprising:
triggering a first buffer status report (BSR), wherein the first BSR indicates an amount of data expected to arrive from a third WTRU to the first WTRU for uplink transmission to a second WTRU;
triggering a second BSR, wherein the second BSR indicates an amount of data already available at the first WTRU for uplink transmission to the second WTRU;
determining whether to include a first BSR Medium Access Control (MAC) Control Element (CE) for the first BSR and/or a second BSR MAC CE for the second BSR into a MAC Protocol Data Unit (PDU) based on at least a rule which prioritizes the second BSR MAC CE over the first BSR MAC CE on the order of inclusion; and
transmitting the MAC PDU using uplink resources allocated by the second WTRU for uplink transmission, wherein
the MAC PDU includes one second BSR MAC CE when the uplink resources are enough to accommodate the second BSR MAC CE but are not enough to accommodate both the first BSR MAC CE and the second BSR MAC CE; and
the MAC PDU includes both the first BSR MAC CE and the second BSR MAC CE when the uplink resources are enough to accommodate both the first BSR MAC CE and the second BSR MAC CE.

9. The method of claim 8, wherein the second WTRU is a parent node of the first WTRU.

10. The method of claim 8, further comprising:
keeping the first BSR triggered and cancelling the second BSR in response to transmitting the MAC PDU.

11. The method of claim 8, wherein the first BSR is a Pre-emptive BSR and the second BSR is a Regular BSR or a Periodic BSR.

12. The method of claim 8, wherein the first WTRU is an integrated access and backhaul (IAB) node, and the third WTRU is a User Equipment (UE) or a child node of the first WTRU.

13. A first wireless transmit/receive unit (WTRU), comprising:
a processor; and
a memory operatively coupled to the processor, wherein the processor is configured to execute a program code to:
trigger a first buffer status report (BSR), wherein the first BSR indicates an amount of data expected to arrive from a third WTRU to the first WTRU for uplink transmission to a second WTRU;
trigger a second BSR, wherein the second BSR indicates an amount of data already available at the first WTRU for uplink transmission to the second WTRU; and
transmit a Medium Access Control (MAC) Protocol Data Unit (PDU) using uplink resources allocated by the second WTRU for uplink transmission, wherein the MAC PDU includes one first BSR MAC Control Element (CE) for the first BSR and one second BSR MAC CE for the second BSR.

14. The first WTRU of claim 13, wherein the uplink resources are enough to accommodate both the first BSR MAC CE and the second BSR MAC CE.

15. The first WTRU of claim 13, wherein the MAC PDU is allowed to include at most one first BSR MAC CE for the first BSR and at most one second BSR MAC CE for the second BSR, even when multiple events have triggered the first BSR or the second BSR.

16. The first WTRU of claim 13, wherein the second WTRU is a parent node of the first WTRU.

17. The first WTRU of claim 13, wherein the processor is further configured to execute a program code stored in the memory to:
cancel the first BSR and the second BSR in response to transmitting the MAC PDU.

18. The first WTRU of claim 13, wherein the first BSR is a Pre-emptive BSR and the second BSR is a Regular BSR or a Periodic BSR.

19. The first WTRU of claim 13, wherein the first WTRU is an integrated access and backhaul (IAB) node, and the third WTRU is a User Equipment (UE) or a child node of the first WTRU.

20. A first wireless transmit/receive unit (WTRU), comprising:
a processor; and a memory operatively coupled to the processor, wherein the processor is configured to execute a program code to:
trigger a first buffer status report (BSR), wherein the first BSR indicates an amount of data expected to arrive from a third WTRU to the first WTRU for uplink transmission to a second WTRU;

trigger a second BSR, wherein the second BSR indicates an amount of data already available at the first WTRU for uplink transmission to the second WTRU;

determine whether to include a first BSR Medium Access Control (MAC) Control Element (CE) for the first BSR and/or a second BSR MAC CE for the second BSR into a MAC Protocol Data Unit (PDU) based on at least a rule which prioritizes the second BSR MAC CE over the first BSR MAC CE on the order of inclusion; and transmit the MAC PDU using uplink resources allocated by the second WTRU for uplink transmission, wherein the MAC PDU includes one second BSR MAC CE when the uplink resources are enough to accommodate the second BSR MAC CE but are not enough to accommodate both the first BSR MAC CE and the second BSR MAC CE; and the MAC PDU includes both the first BSR MAC CE and the second BSR MAC CE when the uplink resources are enough to accommodate both the first BSR MAC CE and the second BSR MAC CE.

\* \* \* \* \*